(12) United States Patent
Matsueda

(10) Patent No.: US 6,873,310 B2
(45) Date of Patent: Mar. 29, 2005

(54) DISPLAY DEVICE

(75) Inventor: Yojiro Matsueda, Chino (JP)

(73) Assignee: Seiko Epson Corporation, Tokyo (JP)

( * ) Notice: Subject to any disclaimer, the term of this patent is extended or adjusted under 35 U.S.C. 154(b) by 247 days.

(21) Appl. No.: 09/820,735

(22) Filed: Mar. 30, 2001

(65) Prior Publication Data

US 2002/0030670 A1 Mar. 14, 2002

(30) Foreign Application Priority Data

Mar. 30, 2000 (JP) ........................................ 2000-093576

(51) Int. Cl.⁷ ................................................ G09G 3/36
(52) U.S. Cl. ............................. 345/77; 345/42; 345/51; 345/80; 345/84; 345/90; 345/98; 345/101; 345/206; 345/690; 257/59; 315/169.3; 347/252; 348/687
(58) Field of Search .............................. 345/42, 50, 51, 345/54, 55, 76, 77, 80, 84, 87, 88, 90, 92, 98, 99, 100, 101, 206–207, 210, 690; 257/59; 315/169.3; 347/252; 348/687, 792

(56) References Cited

U.S. PATENT DOCUMENTS

| | | | | |
|---|---|---|---|---|
| 4,156,927 A | * | 5/1979 | McElroy et al. ............ 711/220 |
| 4,528,480 A | | 7/1985 | Unagami et al. |
| 5,515,068 A | * | 5/1996 | Uragami et al. ............. 345/3.1 |
| 5,646,644 A | * | 7/1997 | Furuhashi et al. .......... 345/100 |
| 5,841,411 A | * | 11/1998 | Francis ........................ 345/58 |
| 5,841,897 A | * | 11/1998 | Numakura et al. ......... 382/163 |
| 5,945,972 A | * | 8/1999 | Okumura et al. ............. 345/98 |
| 5,973,456 A | * | 10/1999 | Osada et al. ............. 315/169.1 |
| 5,977,940 A | | 11/1999 | Akiyama et al. |
| 6,064,158 A | * | 5/2000 | Kishita et al. ........... 315/169.3 |
| 6,104,367 A | * | 8/2000 | McKnight .................... 345/94 |
| 6,104,641 A | * | 8/2000 | Itou ...................... 365/189.01 |
| 6,258,606 B1 | * | 7/2001 | Kovacs ....................... 436/149 |
| 6,278,428 B1 | * | 8/2001 | Smith et al. .................. 345/92 |
| 6,320,568 B1 | * | 11/2001 | Zavracky .................... 345/101 |
| 6,323,867 B1 | * | 11/2001 | Nookala et al. ............ 345/522 |
| 6,326,642 B1 | * | 12/2001 | Yamazaki et al. ............ 257/59 |
| 6,333,766 B1 | * | 12/2001 | Kougami et al. ........... 348/687 |
| 6,384,806 B1 | * | 5/2002 | Matsueda et al. ............ 345/89 |
| 6,388,661 B1 | * | 5/2002 | Richards ..................... 345/204 |
| RE37,879 E | * | 10/2002 | Takeuchi .................... 348/584 |
| 6,462,722 B1 | * | 10/2002 | Kimura et al. ................ 345/76 |
| 6,489,956 B1 | * | 12/2002 | Deering ...................... 345/419 |
| 6,498,617 B1 | * | 12/2002 | Ishida et al. ................ 347/252 |
| 6,518,941 B1 | * | 2/2003 | Kimura ........................ 345/55 |
| 6,583,777 B2 | * | 6/2003 | Hebiguchi et al. ............ 345/92 |

FOREIGN PATENT DOCUMENTS

| | | |
|---|---|---|
| JP | A-56-59291 | 5/1981 |
| JP | A-59-187395 | 10/1984 |
| JP | A-60-222895 | 11/1985 |
| JP | A-62-257197 | 11/1987 |
| JP | 02-148687 | 6/1990 |
| JP | A-7-261155 | 10/1995 |
| JP | 08-054836 | 2/1996 |
| JP | A-8-194205 | 7/1996 |
| JP | 09/016122 | 1/1997 |
| JP | 10-254410 | 9/1998 |
| JP | 10-312173 | 11/1998 |
| JP | 10-319909 | 12/1998 |
| JP | 10-333641 | 12/1998 |
| JP | A-11-2797 | 1/1999 |

\* cited by examiner

*Primary Examiner*—Bipin Shalwala
*Assistant Examiner*—Vincent E. Kovalick
(74) *Attorney, Agent, or Firm*—Oliff & Berridge, PLC

(57) ABSTRACT

Provided is a display device having a storing circuit 21 section for storing image signals for controlling display and an active device section 22 for performing display control on the basis of the image signals stored by the storing circuit section 21, provided in each dot as a minimum unit of display, thereby achieving space saving.

23 Claims, 14 Drawing Sheets

(a)

(b)

DISPLAY DEVICE

TECHNICAL FIELD

This invention relates to a display device. The invention is especially effective for the reflective liquid-crystal display (LCD) or organic EL display (OELD), which is intended to achieve space saving while reducing electric power.

BACKGROUND OF THE INVENTION

Recently, the display devices using liquid crystal (hereinafter, referred to as display) is spreading at conspicuous pace. The display of this type is low in power consumption and improved in saving space, in comparison with a CRT display. Accordingly, it is important to make use of the merits of such a display and produce a display that is lower in power consumption and improved in saving space.

FIG. 15 is a block diagram of a system for providing display on a display device by a TFT display. This system is configured with a digital interface 100 and a TFT liquid crystal display panel 101. The digital interface 100 is configured, at least, with a CPU 100A, a RAM 100B, a frame memory 100C and an LCD controller 100D. The CPU 100A is operation control means for transmitting display data while exchanging data with the RAM 100B as a general-purpose memory. Because this RAM 100B is not especially used merely as a memory for display, there is newly a need of a memory for storing the data for display. That is the frame memory 100C. The frame memory 100C temporarily stores the display data in an amount of one screen of the liquid crystal panel 101C (hereinafter, the data in an amount of one pixel is given display data, and each binary signal constituting the display data is referred to as an image signal). The LCD controller 100D carries out transmission control of display data in order to display, in timing, each of display data stored in the frame memory 100C in a display position on the liquid crystal panel 101C. Herein, for a CRT there is a necessity to transmit display data through conversion into analog data. It is however considered that the interface of the liquid crystal display is compatible with digital data, and herein the display data is transmitted by an image signal as digital data.

Meanwhile, the TFT liquid crystal display panel 101 in configured with a scanning line driver 101A, a digital data driver 101B and a liquid crystal panel 101C. The scanning line driver 101A carries out display control in a scanning line (row) direction on the basis of the timing data transmitted from the LCD controller 100D. The digital data driver 101B is allowed to receive and process the digital-data image signal. The digital data driver 101B carries out display control in a data-line (column) direction on the basis of the timing data transmitted from the LCD controller 100D. On that occasion, it also controls the tonal levels of display. The liquid crystal panel 101C is a panel having TFTs (Thin Film Transistors) to effect display under the control of the scanning line driver 101A and digital data driver 101B.

Such a system requires a frame memory 100C for temporarily store the display data in an amount of all over the screen. Furthermore, an LCD controller 100D is required to transmit an image signal for the display data to the digital data driver 101B.

Consequently, the system overall requires many of means thus increasing its scale. Moreover, the reduction of consumed power cannot be achieved because of a great deal of the amount of transmitting such data and large power consumption as a result thereof.

Therefore, it is a problem of the present invention to provide a display device capable of achieving space saving and consumed power reduction for the system overall.

DISCLOSURE OF THE INVENTION

In order to solve the problem as above, a display device according to the present application comprises: a storing section for storing a digital data signal for controlling display; and a display control section for performing display control on the basis of the digital data signal stored by the storing section; provided in each dot as a minimum unit of display and arranged on a semiconductor or insulating substrate.

BRIEF DESCRIPTION OP THE DRAWINGS

FIG. 6 represents a one-period waveform of PWMCLK in a third embodiment.

Figure 1:
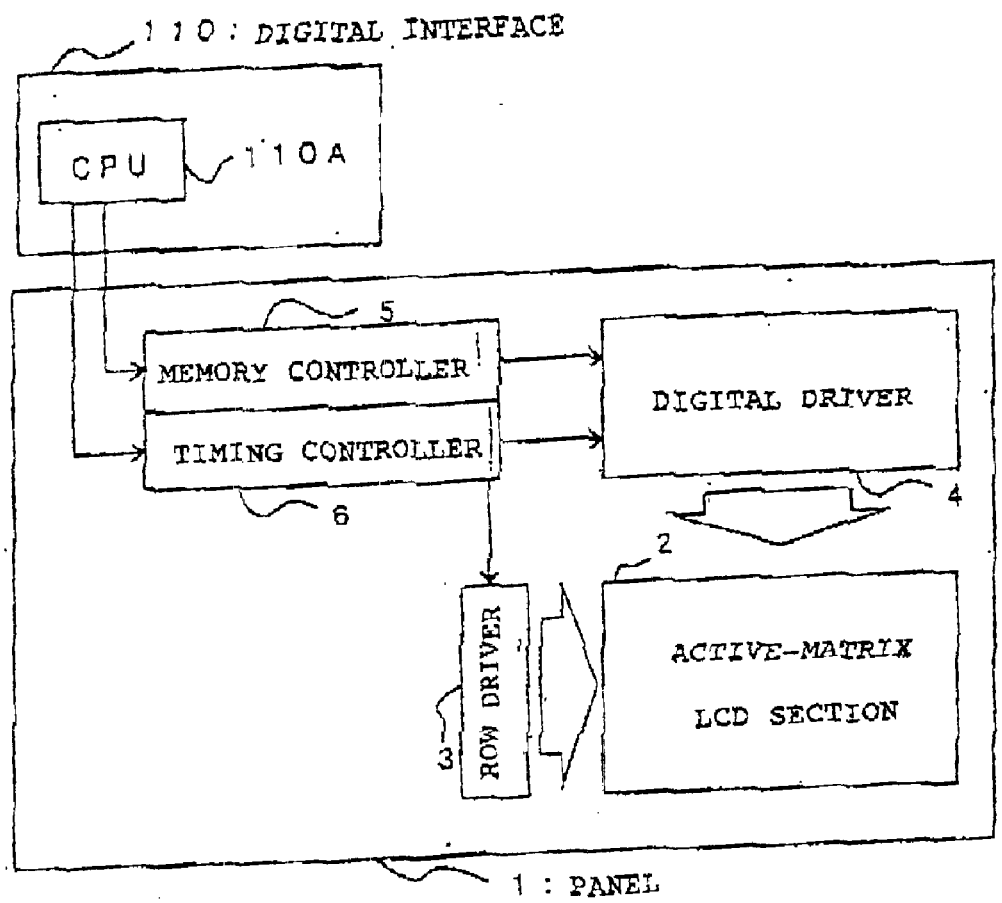
FIG. 1 is a block diagram representing a concept of a system including a display device according to a first embodiment of the present invention.

(Explanation of Reference Numerals)
1, 1A, 1B, 1C Panel
2, 2C Active-matrix LCD section
2A, 2B Active-matrix OELD section
21, 21A, 21B Storing circuit section
22, 22A, 22B, 22C Active device section
23 PWM waveform forming circuit
24, 24A, LC section
25, 25A, OEL luminescent section
3 Row driver section 31, 31A Row decoder
32 Word line driver
4 Digital data driver section
41 Column decoder
42 Input control circuit
43, 43A, 43B Column selection switch section
5 Memory controller
6, 6A Timing controller
61 Address buffer
62, 62A, PWM timing signal generating circuit
110 Digital interface
110A CPU

DETAILED DESCRIPTION OF THE INVENTION

A display device comprises: a storing section for storing a digital data signal for controlling display; and a display control section for performing display control on the basis of the digital data signal stored by the storing section; provided in each dot as a minimum unit of display and arranged on a semiconductor or insulating substrate.

In this display device, in order to control on-screen display, the storing section for storing a signal and the display control section for controlling on-screen display on the basis of the signal stored by the storing section are provided in each dot. Furthermore, they are integrated on a semiconductor or insulating substrate, i.e. within each dot array pattern. Power reduction is achieved by the space saving due to the decrease of the circuits to be structured in an area other than the display region and storing all the signals required for on-screen display.

Also, a display device according to the invention comprises: a storing section configured by one or a plurality of storing circuits provided at each of interconnections of a plurality of write lines and a plurality of data lines correspondingly to an array pattern of a dot as a minimum unit of display so that, when a write signal is transmitted through the write line and an image signal as a digital data signal for controlling display is transmitted through the data line, the image signal is stored; a converting section for converting a value based on a value of the image signal stored by the storing section into an analog signal; and a display control section for performing tonal control using a liquid crystal on the basis of an analog signal converted by the converting section; provided in each dot as a minimum unit of display and arranged on a semiconductor or insulating substrate.

In this display device, the storing section configured by one or a plurality of storing circuits is provided at each intersection of a plurality of write lines and a plurality of data lines, to store in the storing section all the image signals required for on-screen display. The converting section converts the value based on the image signals into an analog signal on a dot-by-dot basis, and the display control section performs tonal control using a liquid crystal on the basis of the analog signal. These are integrated on a semiconductor or insulating substrate, i.e. within each dot array pattern.

Also, in a display device according to the invention, the storing circuit of the storing section is configured by a static circuit.

In this display device, the storing circuit is configured by a static circuit thereby achieving to hold the image signals in a term as long as possible.

Also, the converting section of the display device according to the invention pulse-width-modulates the value based on the image signal to convert the same into the analog signal.

In this display device, the converting section performs pulse width modulation in converting the value based on the image signals into an analog signal.

Also, the converting section of the display device according to the invention converts the value based on the image signal into the analog signal modulated to a pulse width based on a γ-characteristic.

In this display device, the converting section performs pulse width modulation based on a γ-characteristic in converting the value based on the image signals into an analog signal.

Also, the converting section of the display device according to the invention performs conversion into the analog signal at a constant period interval.

In this display device, a constant period is provided as a unit because control is made by converting the value based on the image signals into a time based on a pulse width. Also, where display control is made, for example, with a liquid crystal, there is a need to perform refresh at a constant time interval. For this reason, it is more convenient to perform conversion at a constant time interval Also, in the converting section of a display device according to the invention, provided is a duration that no conversion into an analog signal is made in a duration of a constant period.

In this display device, a duration that no conversion into the analog signal is made is provided in a duration of the constant period. In this duration, the image signals are changed to the storing section.

Also, in the converting section of a display device according to the invention, a start time of the constant period is different between the converting sections, and the period no conversion into the analog signal is made is different.

In this display device, in order to suppress flicker, a start time of the constant period is different between the converting sections, and the duration no conversion into an analog signal is made is different. Actually, this is made for each converting section on a row-unit or column-unit basis from a relationship of control, etc.

Also, an alternating current drive voltage is applied to the display control section or a display device according to the invention.

In this display device, where display control is made using a liquid crystal, voltage application if deviated shorten the lifetime from the viewpoint of characteristics of a liquid crystal. Accordingly, an alternating current drive voltage is applied.

Also, in a display device according to the invention, the alternating current drive voltage is a voltage driven at VCOM±Va with respect to a reference voltage VCOM.

In this display device, in order to suppress power consumption, the alternating current drive voltage is given a voltage driven at VCOM±Va so as to vary only the alternating current drive voltage on the basis of a reference voltage.

Also, in a display device according to the invention, the alternating current drive voltage is a voltage alternating-current-inversion-driven by two voltage-applying lines laid correspondingly to the dot array pattern.

In this display device, in order to simplify the circuit configuration, the alternating current drive voltage is such a voltage as alternating-current-inversion-driven by two voltage-applying lines laid correspondingly to the dot array pattern.

Also, a display device according to the invention, a plurality of rows of the dot array are provided by groups, and rows in pair are set in each of the groups to invert a phase of the alternating current drive voltage applied.

In this display device, in order to suppress flicker, rows in pair are set in each of the groups to invert a phase of the alternating current drive voltage applied.

Also, the display control section of a display device according to the invention controls light emission of current-driven luminescent devices in connection on the basis of the analog signal in place of performing tonal control using a liquid crystal, thereby effecting tonal control.

In this display device, the display control section is connected with current-driven luminescent devices spontaneously emitting light by current drive so that emitted light is controlled on the basis of the analog signal thereby achieving tonal control.

Also, a display device according to the invention comprises: a storing section configured by one or a plurality of storing circuits provided at each of interconnections of a plurality of write lines and a plurality of data lines correspondingly to an array pattern of a dot as a minimum unit of display so that, when a write signal is transmitted through the write line and an image signal as a digital data signal for controlling display is transmitted through the data line, the image signal is stored; one or a plurality of active devices provided respectively connected to the storing circuits of the storing section and current-driven luminescent devices having areas corresponding to place values represented by image signals stored in the storing circuits, a display control section provided in each dot to control emission of light of the current-driven luminescent devices on the basis of the values of the image signals stored in the storing circuits, and these are arranged on a semiconductor or insulating substrate.

In this display device, a storing section configured by one or a plurality of storing circuits is provided at each of interconnections laid with a plurality of write lines and a plurality of data lines, to store all the image signals required for on-screen display in each storing section. In the display control section, one or a plurality of active devices provided respectively connected to the storing circuits of the storing section and current-driven luminescent devices having areas corresponding to place values represented by image signals stored in the storing circuits controls the current to be supplied to the current-driven luminescent devices on the basis of a value of the image signals (e.g. 0 or 1), thereby controlling light emission. These are integrated on a semiconductor or insulating substrate, i.e. within each dot array pattern.

Also, a display device according to the invention has said current-driven luminescent devices structured by EL devices.

In this display device, display is made by the EL devices as one kind of a current-drive luminescent device having the features of reduced thickness, high definition, reduced power consumption, etc.

Also, a display device according to the invention has the current-driven luminescent devices structured by organic EL devices.

In this display device, display is made by an organic EL devices having the further features of inexpensive, low-temperature process and so on, besides the features of reduced thickness, high definition, reduced power consumption, etc. possessed by the EL devices.

Also, a display device according to the invention comprises; a storing section configured by one or a plurality of storing circuits provided at each of interconnections of a plurality of write lines and a plurality of data lines correspondingly to an array pattern of a dot as a minimum unit of display so that, when a write signal is transmitted through the write line and an image signal as a digital data signal for controlling display is transmitted through the data line, the image signal is stored; one or a plurality of active devices provided respectively connected to the storing circuits of the storing section and liquid crystal driving sections having areas corresponding to place values represented by image signals stored in the storing circuits, a display control section provided in each dot to perform drive control using a liquid crystal on the basis of the values of the image signals stored in the storing circuits, and these are arranged on a semiconductor or insulating substrate.

In this display device, a storing section configured by one or a plurality of storing circuits is provided at each of the each of interconnections laid with a plurality of write lines and a plurality of data lines, to store all the image signals required for on-screen display in each storing section. In the display control section, one or a plurality of active devices provided respectively connected to the storing circuits of the storing section and liquid crystal drive sections, e.g. pixel electrodes, having areas corresponding to place values represented by image signals stored in the storing circuits controls the current to be supplied to the liquid crystal drive sections on the basis of a value of the image signals (e.g. 0 or 1), thereby controlling the brightness of display due to the liquid crystal. These are integrated on a semiconductor or insulating substrate, i.e. within each dot array pattern.

Also, a display device according to the invention further lays a plurality of read lines correspondingly to the dot array pattern so that, if a read signal is transmitted, the image signals stored in the storing circuits are read out of the storing section.

In this display device, a plurality of read lines are laid correspondingly to the dot array pattern so that, if a read signal is transmitted, the image signals stored in the storing circuits are read out of the storing section thereby effecting data inputting and outputting in the display device.

Also, a display device according to the invention comprises: a display drive section having a plurality of word lines, a plurality of write lines and a plurality of data lines laid correspondingly to an array pattern of a dot as a minimum unit of display, and a display control section operating, when at least a write signal is transmitted through the write lines and the image signals are transmitted through the data lines, on the basis of the storing section for storing the image signals, the image signals and a word signal transmitted through the word lines, provided in each of the dot array patterns; a word line driver section for controlling transmission of a word signal to the word lines; a row decoder section for selecting a row for transmitting a write signal to the write lines, to transmit the write signal to a selected row; a column decoder for selecting the data line; a column selection switch section for transmitting the image signals as data signals for controlling display to the data line selected by the column decoder section; integrated and integrally formed on a semiconductor or insulating substrate.

In this display device, a display drive section is laid with a plurality of word lines, a plurality of write lines and a plurality of data lines, and a display control section operating on the basis of the storing section for storing the image signals, the image signals and a word signal transmitted through the word lines, that are provided in each of the dot array patterns. Further, provided are a word line driver section for controlling transmission of a word signal to the word lines, a row decoder section for selecting a row for transmitting a write signal to the word lines to transmit the write signal to a selected row, a column decoder for selecting the data line, a column selection switch section for transmitting the image signals as data signals for controlling display to the data line selected by the column decoder section. These are integrated and integrally formed on a semiconductor or insulating substrate.

Also, in the display drive section of a display device according to the invention, a converting section for converting a value based on the image signals stored in the storing section into an analog signal is provided in each dot array pattern, and the display control section operates on the basis of the analog signal and the word signal.

In this display device, in the display drive section, the converting section is further provided between the storing section and the display control section. Because the display control section operates on the basis of the image signals, an analog signal, e.g. due to pulse modulation, is generated.

Also, in a display device according to the invention, said word lines are laid to transmit the word signal to the display control section on two rows.

In this display device, in order to reduce interconnections, the word lines as power supply lines are shared between the display control sections, for example, on the upper and lower two rows, to transmit a word signal (supply power).

Also, the word line driver section and the row decoder section in a display device according to the invention are allocated correspondingly to a length of the display drive section in a row direction, and the column decoder section and the column selection switch section are allocated correspondingly to a length of the display drive section in a column direction.

In this display device, in order to size-reduce the layout in an area other than display, the word line driver section and the row decoder section are allocated correspondingly to a length of the display drive section in a column direction, and the row decoder section and the column selection switch section are allocated correspondingly to a length of the display drive section in a column direction, thereby achieving space saving.

Also, each column selection switch structuring the column selection switch of a display device according to the invention is allocated correspondingly to a width of the dot array pattern.

In this display device, each column selection switch is allocated corresponding to the width of the dot array pattern, in order to provide efficient layout.

Also, a display device according to the invention, said row decoder section selects a row for transmitting the write signal on the basis of an address signal representing a storage position.

In this display device, in order to enable selection of an arbitrary row, the row decoder section selects a row for transmitting the write signal on the basis of an address signal.

Also, the column decoder section of a display device according to the invention selects the data lines on the basis of the address signal.

In this display device, in order to enable an arbitrary data line (column), the column decoder section transmits a data line on the basis of an address signal.

Also, in a display device according to the invention, three dots for developing and displaying in red, blue and green as light source colors are provided as one pixel, the image signals are inputted on a one-pixel-unit basis, and the column decoder section selects data lines for storing the image signals in an amount of one pixel.

In this display device, in color display, three dots for developing and displaying in red, blue and green as light source colors are provided as one pixel. The image signals are inputted on a one-pixel-unit basis as a reference of change of display. Also, the column decoder section selects data lines for storing the image signals in an amount of one pixel.

Also, in the display device according to the invention, that three dots for developing and displaying in red, blue and green as light source colors are provided as one pixel, the image signals are inputted on a one-pixel-unit basis, and the column decoder section selects data lines for storing the image signals in an amount of a plurality of pixels.

In this display device, in the case of performing color display, in order to reduce the clock frequency for use in storage, the image signals are inputted on a plurality-of-pixels-unit basis. The column decoder section selects data lines in an amount of a plurality of pixels.

Also, a display device according to the invention further comprises: a timing controller section for controlling at least timing of transmitting the address signal; a memory controller section for controlling transmission of the image signals; further integrated and integrally formed on the substrate.

In this display device, the peripheral circuits required for controlling display are all systematically integrally formed on the same substrate.

Embodiments of the Invention

Next, preferred embodiments of the present invention will be explained based on the drawings.

Embodiment 1

FIG. 1 is a block diagram representing a concept of a system including a display device according to Embodiment 1 of the invention. FIG. 1 represents a concept called a system-on-panel (SOP). SOP is a concept for integrally forming all the circuit systems concerned with display, such as an active matrix, peripheral drive circuit, memories and controllers, on an insulating substrate, such as glass by the use of polycrystalline silicon TFTs or the like. For this reason, it is possible to directly couple a panel to a CPU and hence to achieve cost reduction, reliability improvement and space saving.

In FIG. 1, a digital interface 110 is configured with a CPU 110A to transmit display data. Meanwhile, a panel 1 as a display device has a drive section configured by an active-matrix LCD section 2, a row driver 3, a digital data driver 4, a memory controller 5 and a timing controller 6.

Figure 2:
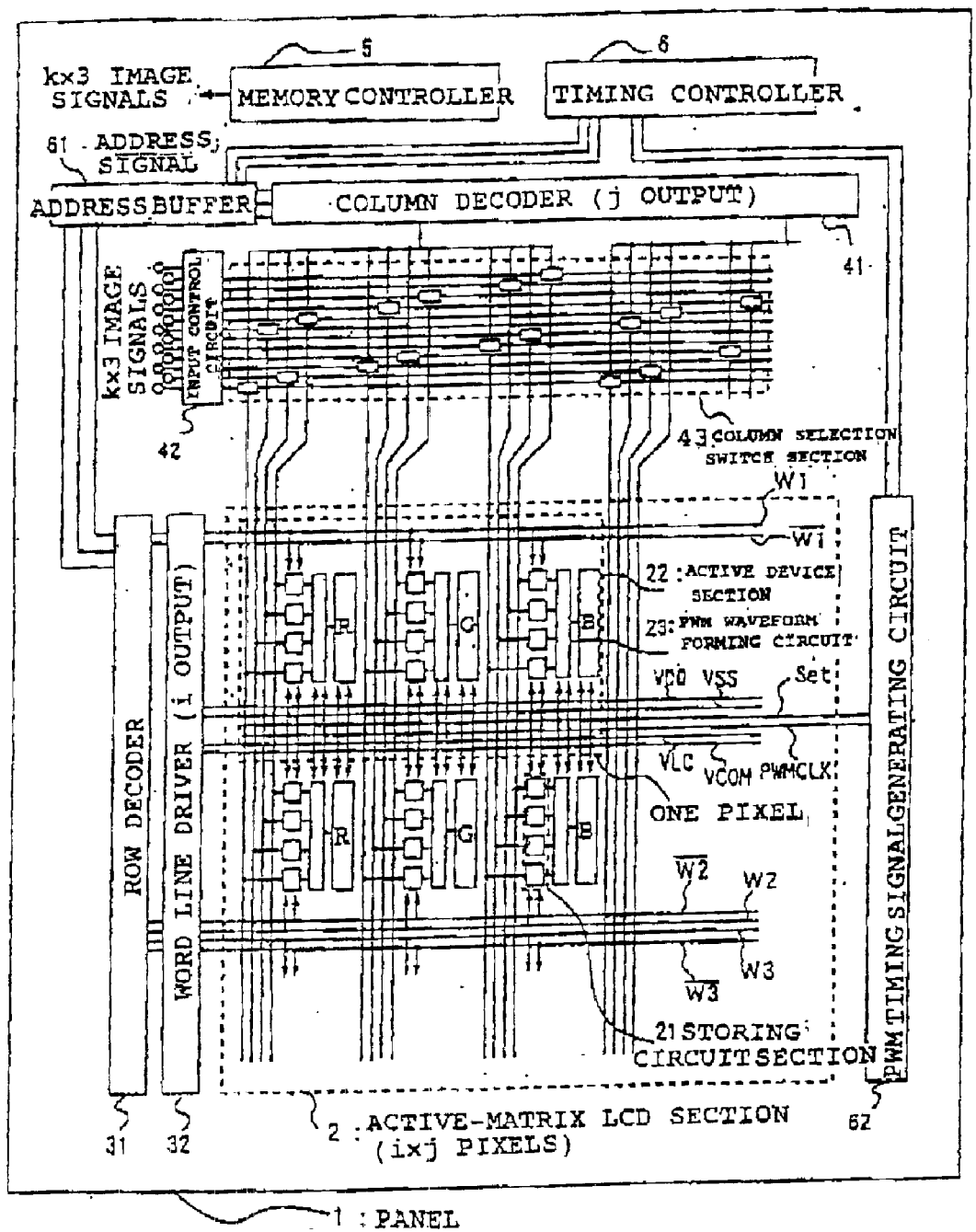
FIG. 2 is a diagram representing in detail a drive section of a panel 1.

FIG. 2 is a diagram showing in detail a drive section of the panel 1. The active-matrix LCD section 2 uses active devices, such as TFTs and diodes, to effect display and stores pixel signals in one screen by the use of a storage circuit section. The active-matrix LCD section 2 is arrayed with pixels in the number of i×j. The present invention, assumed on a color display, has light-source colors of R (red), G (green) and B (blue) three dots (called also as sub-pixels) of which configure one pixel. It is assumed herein that one dot represent one point, as a minimum unit, for effecting display. For a monochromatic display, one pixel equals to one dot.

Figure 3:
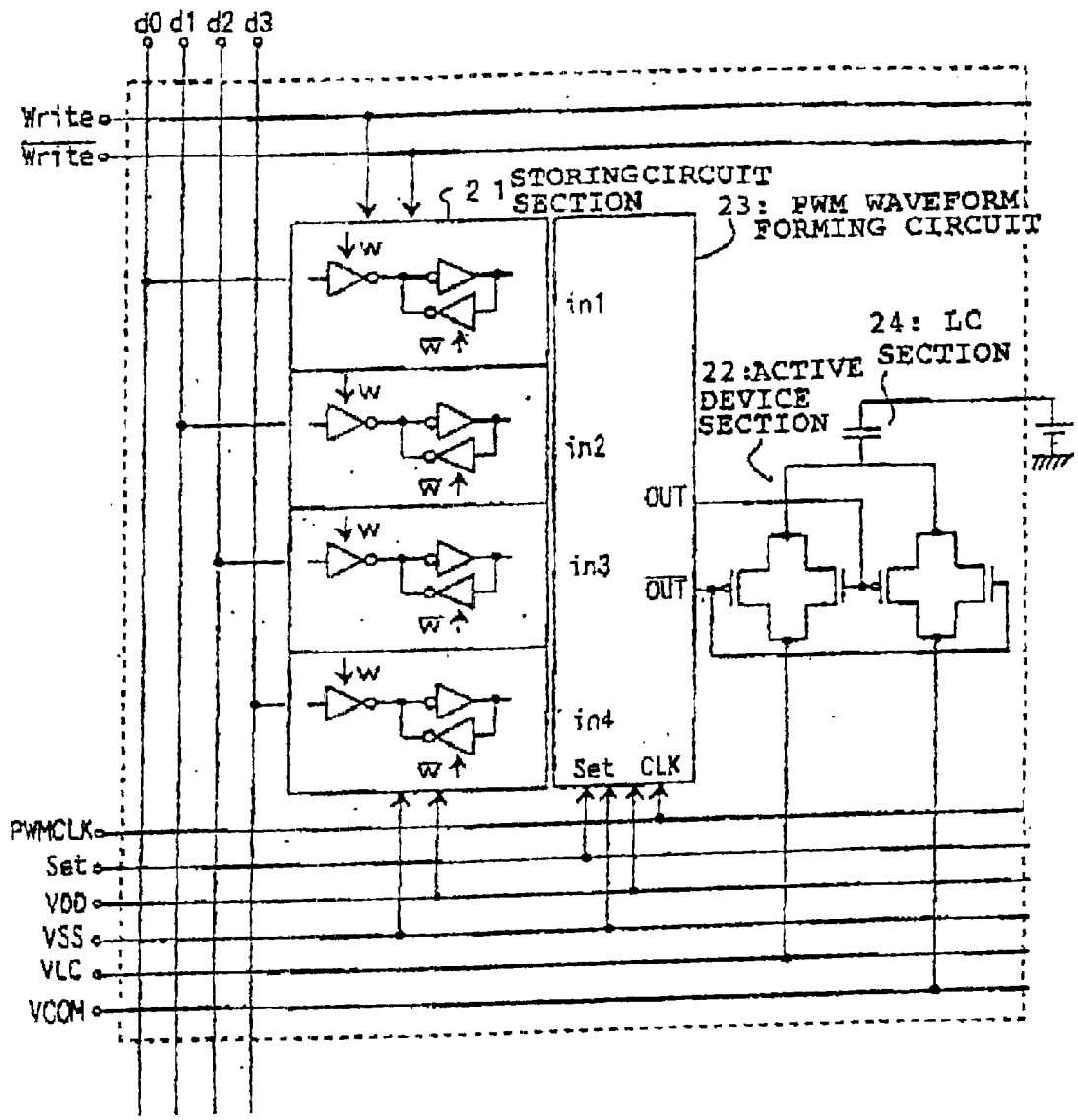
FIG. 3 is a diagram representing an equivalent circuit configured in each dot of an active-matrix LCD section 2.

FIG. 3 is a diagram representing an equivalent circuit configured in each dot of the active-matrix LCD section 2. Each dot area includes data lines, wordlines, active devices arranged at the intersections of them (e.g. switch devices by transistors, diodes or the like), DAC (e.g. a PWM waveform forming circuit) and storage circuits (e.g. latch circuits). In the figure, 21 is a storage circuit section (storage section) configured by one or a plurality of memory cells (storage circuits). In the figure, four memory cells are provided. It is herein assumed that each memory cell be static. Consequently, data can be held without refresh at a constant time interval. Each memory cell, when inputted with a Write signal, holds (stores) a binary signal (data) transmitted through d0, d1, d2 or d3. Herein, because four memory cells are used for one dot, an information amount of 4 bits (value in 16 combinations) can be held. Each dot can represent a brightness (tonal level) based on that value. The number of the memory cells is in the same as the number of a value k, hereinafter referred.

23 is a PWM waveform farming circuit (converting section). The PWM waveform forming circuit 23 is a kind of a counter. This is so-called a digital/analog converter (DAC) for representing as a PWM waveform (analog data with a pulse width) a value represented by image signals on the basis of the image signals (digital data) held by the storage circuit section 21. In order to respond to an effective value of an applied voltage, for tonal representation the LCD is required to convert a data signal into an analog signal. Furthermore, in order to secure a lifetime of liquid crystal, there is the need to apply an alternating voltage inverting at a constant time interval. For this reason, the present embodiment first converts digital data once into a time-base-modulated analog timing signal by the use of the PWM waveform forming circuit 23, and thereafter applies an alternating current drive voltage VLC to the liquid crystal by the use of that timing signal.

22 is an active device section (display control section), for example, of TFTs (thin film transistors). The conventional active device has connections between the drain (or source) and the data line and between the gate and the word line. In FIG. 3, the configuration is by dynamic devices. Meanwhile, the drain (or source) and the word line are in connection while the gate and the data line are in connection. Consequently, the active devices in the present embodiment do not switch by drive to the word lines but switches on the basis of values based on image signals (pulse width due to PWM) to adjust the charge (current to be supplied to the pixel electrodes) stored on the pixel electrodes (not shown). The pixel electrode forms a capacitance with a counter electrode through a liquid crystal (LC section 24). By a voltage applied between the pixel electrode and the counter electrode, the optical rotatory power due to liquid-crystal molecules is controlled to effect display control of the dots. Moreover, even if the switch of the active device section 22 is off (non-operation period), the pixel electrode is allowed to maintain its display state owing to built-up charge until refreshing in the next time (until rewriting display data). 24 is an LC section. The LC section 24 is a to-be-driven part actually not formed on the glass substrate. From the foregoing, storage drive control on each dot is implemented by signal transmission (current supply, voltage application) through the data lines (d1, d2, d3 and d4) and the word lines (write). Also, display drive control is implemented by signal transmission through the word lines (VLC and VCOM), PWMCLK and Set. Herein, VDD and VSS are provided to supply power to the storage circuit section 21 and PWM waveform forming circuit 23. Meanwhile, the signal lines of VDD, VSS, VLC, VCOM, PWMCLK and Set can be shared between two rows. This achieves layout simplification due to the reduction of interconnect lines, space saving, area increase of dot array patterns (opening-ratio increase).

In FIG. 2, it is a row driver 3 to control the drive to the word lines. The row driver 3 is structured by a row decoder 31 and a word line driver 32. The row decoder 31 selects and transmits a Write signal to a row of pixels for storing or rewriting (hereinafter, merely referred to as "store") display data on the basis of input address data.

Figure 4:
FIG. 4 is a diagram representing a relational example of drive waveforms of VLC and VCOM.
Figure 4:
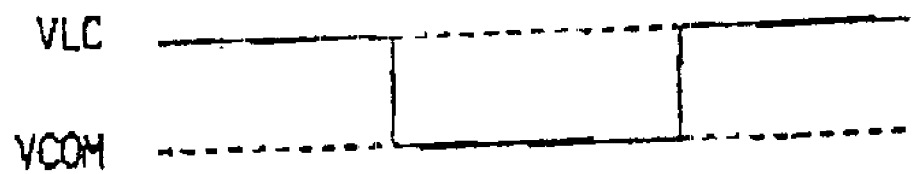

FIG. 4 is a diagram showing a relational example of VLC and VCOM drive waveforms. The word line driver 32 drives the VLC and VCOM. Because the LCD requires alternating drive, at least the VLC must be made in the form of an alternating current. FIG. 4($a$) is a waveform when VLC= VCOM±Va is given. Where the relationship between VLC and VCOM is given as in FIG. 4($a$), consumption current can be reduced because COM is satisfactorily constant. Due to this, as the smaller the display area (the number of pixels), the greater the power reduction can be achieved. This accordingly is suited for a reflective LCD used for displaying characters (letters, symbols, etc.). Also, because VCOM to be supplied commonly to all the rows is constant regardless of time, each VLC can be driven (scanned) with phase deviation. It is noted that, in this case, there is increase in the number of power sources and complication in circuit configuration.

On the other hand, FIG. 4($b$) is a waveform when driving is made such that VLC and VCOM are alternating-current inversion with opposite phase. In this case, it is possible to reduce the number of power sources and simplify the circuit structure. However, because VCOM itself changes in potential without causing display, power is consumed by the capacitance between the interconnections and the VCOM. Accordingly, there is increase in consumption power by VCOM regardless of display area broadness. Meanwhile, VCOM is common to all the rows as mentioned before. Accordingly, because all of the VLC must be driven on the basis of the phase of VCOM, each of VLC cannot be driven (scanned) with phase deviation.

On the other hand, it is a digital data driver 4 that drives the data lines. The digital data driver 4 is configured with a column decoder 41, an input control circuit 42 and a column selection switch section 43. The column decoder 41 selects a column having the pixels to be stored (rewritten) with display data from among the columns (in the number of j) on one row (line) on the basis of input address data. This selects data lines to be driven. The input control circuit 42 is a circuit for controlling one pixel of image signals (k×3) parallel-transmitted from the memory controller 5. As described before, the value of k and the number of memory cells in the storage circuit section 21 are the same, which is the number required to represent the dots at a brightness with tonal levels of $2^k$. Consequently, k=4 is given in FIG. 2, wherein 16 tonal levels of brightness are to be set on each dot. The column selection switch section 43 is provided correspondingly to the number of pixels (that is, k×3×j) on one line on the basis of image signals (k×3) per pixel as a unit. Each column selection switch switches on the basis of the selection by the column decoder 41 and image signals to transmit image signals onto (drive) the data lines. The column selection switch is configured for arrangement correspondingly to a width nearly the same as a width of the dot. Accordingly, the column selection switch section 43 will not be longer in width than the active matrix LCD section 2, and can be ideally laid out in view of interconnections.

The memory controller 5 controls as image signals of k×3 the display data transmitted from the CPU 110A. Also, the timing controller 6 has at least an address buffer 61 and a PWM taming signal generating circuit 62, to transmit an address signal to the row decoder 31 and column decoder 41 in order to store the display data transmitted from the CPU 110A. Also, transmitted is a timing signal for generating PWMCLK to the PWM timing signal generating circuit 62. The PWM timing signal generating circuit 62 generates a PWMCLK as a reference for forming a PWM waveform in the PWM waveform forming circuit 23 on the basis of the timing signal. Also, selected are Set lines to transmit a Set signal.

It is the active-matrix LCD section 2 as an actual display part that occupies the greatest area in the glass substrate (panel). Moreover, its size is fixed. Accordingly, it is the problem in the SOP with what efficiency the systems, such as peripheral circuits, are laid out in portions other than the active-matrix LCD section 2 and whether integration density is to be increased for realization of such layout. Furthermore, it is possible to take a way of thinking of effectively utilizing the size-fixed active-matrix LCD section 2. For this reason, the present embodiment forms within each dot the memory cells and DACs required for displaying the dot at a certain tonal level, thus achieving extreme space saving. That is, the pixel array and the memory array are made the same to eliminate the necessity of providing, outside the active-matrix LCD section 2, a space for providing the memory cells for storage of one screen of display data. Moreover, one screen of data can be all stored because of the storage circuits in each dot. For the reason, the data exchange with the CPU 110A is reduced to achieve also the reduction in consumption power by exchanging only the display data for the pixels to be changed of display (rewritten of display data). However, there is a possibility that the area occupied by circuits within the dot increases as compared to the conventional case of forming TFTs only. Consequently, with a scheme of light transmission from the backside by a backlight, there is a possibility of increasing the opening ratio to decrease the transmissivity. Accordingly, it is to be considered that the present embodiment is suited for a reflective LCD.

Figure 5:
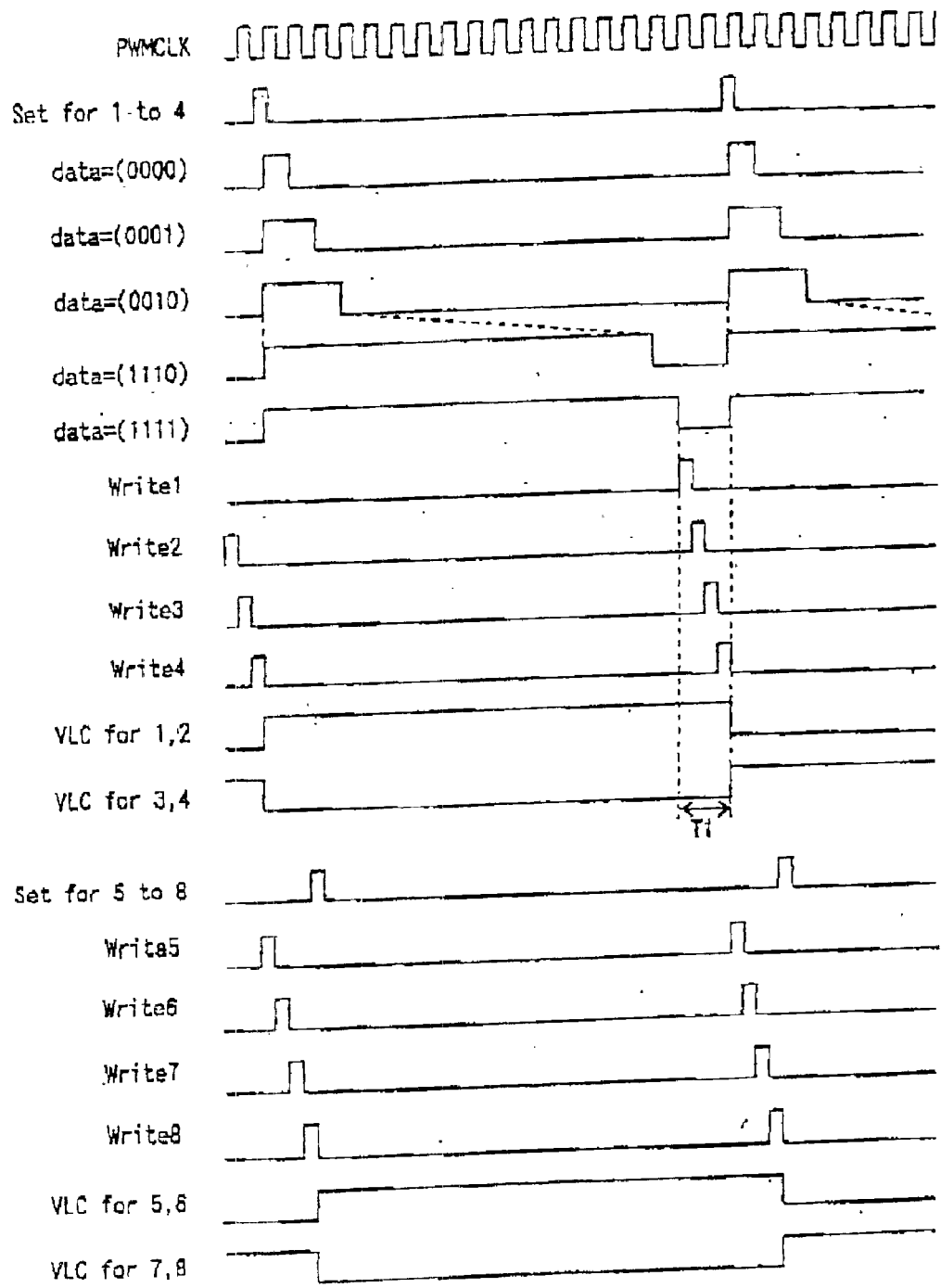
FIG. 5 is a diagram representing each drive waveform example of the signals inputted by a row driver 3 and the digital data driver 4.

FIG. 5 is a figure representing drive waveform examples of the signals inputted by the row driver 3 and digital data driver 4. Based on the figure, explanation is made on the storage operation and display operation in the present embodiment. First explained is the display operation. Herein, four rows are taken as one group to control the operation of display. It is assumed herein that VLC assumably have one period comprising 40 periods of PWMCLK (refresh interval of 20 periods of PWMCLK). This varies depending on the PWMCLK required respectively for display operation and storage operation.

Inputted with a Set signal, the PWM waveform forming circuit 23 generates a pulse waveform having a width based on the PWMCLK and image signal stored in the storage circuit section 21. In FIG. 5, each of data represents a relationship between a value represented by each image signal stored in the storage circuit section 21 and a PWM waveform. Provided that the value due to the image signals stored in four memory calls is "0000", the conversion by the PWM waveform forming circuit 23 is into a pulse width of one PWMCLK waveform. Also, with "0001", the conversion by the PWM waveform forming circuit 23 is into a pulse width of two PWMCLK waveforms. Similarly, with "0010" the conversion is for three PWMCLK waveforms, and with "0011" the conversion is for four PWMCLK waveforms. Finally, with a value "1111" the conversion is for sixteen PWMCLK waveforms. Because the conversion herein is with the 4-bit value, conversion is possible with 16 periods of PWMCLK. However, the PWMCLK required for display operation varies depending upon a range of value of conversion.

The LCD, requiring alternating-current drive, needs to be driven while refreshing all the pixels at least at a certain frequency. It is noted that the pixels not to be driven, i.e. the off-state pixels, do not require refresh because no voltage is satisfactorily applied thereto. Herein, although consumption power reduction can be achieved by lowering the frequency, flicker occurs due to punch-through voltage or the like. In order to make flicker not conspicuous while achieving consumption power reduction, for a still picture the PWMCLK is set to effect refresh at a frequency of minimally 30 Hz (liquid crystal is 15-Hz driven) thus maintaining a display state. Herein, driving is made by inversion of the phase on first and second rows of VLC in one group and the phase on third and fourth rows of VLC, in order to further suppress flicker. By thus always displaying nearly halves of the screen in different phases, the transmissivity difference due to polarity difference is averaged making flicker not conspicuous. Although the first, second row and the third, fourth row are inverted, this in not limited to.

In FIG. 5, because a Set signal in the next group is inputted after about two periods of PWMCLK, the VLC phases in the next group deviate by the corresponding amount (however, the VLC phases inputted to 40–44th rows again become same). It is of importance herein that there is a need to make same the rise of VLC and the rise of PWMCLK. Display operation is implemented by operating the PWMCLK, Set, VLC and VCOM in the above timing.

Next, storage operation will be explained. Although the VLC has a period comprising 40 periods of PWMCLK (refresh interval of 20 periods of PWMCLK), the PWM waveform forming circuit 23 operates only in time of 16 periods of PWMCLK. Accordingly, the retaining portion is given as a non-operative period of the PWM waveform forming circuit 23 (this period taken T1). Storage operation is made within the non-operative period T1. Although herein T1 is set as 4 periods of PWMCLK, the value T1 is adjusted in a range for storage operation.

In FIG. 5, Write signals are inputted at an interval of a half period of PWMCLK. It is assumed that, if one Write signal is inputted, display data be stored to a certain row. With the configuration of FIG. 1, one pixel of image signals (k×3) only is inputted per time to the input control circuit 2, and one pixel of rows only can be selected per time by the column decoder 41. Consequently, despite made for the row, there is no change in one-row display data simultaneously with the input of a Write signal.

Meanwhile, although in FIG. 5 the Write signal is driven in synchronism with PWMCLK, there is no especial necessity of such synchronism. The importance lies only in that the storage operation to the storage circuit section 21 must be carried out within the non-operative period T1 of the PWM waveform forming circuit 23. Accordingly, it is also possible for the column decoder 41 to scan and select each column for storage during inputting the Write signal.

Furthermore, if there are allowances available, storage operation can be also made to all the dots (pixels) that the PWM waveform forming circuit 23 is out of operation. In this case, however, there is increase in clock frequency required for storage operation. For this reason, by utilizing arbitrary designation of an address signal of the timing controller 6 on a pixel-by-pixel basis and static circuits of memory cells, only the pixels to be rewritten may be selected and rewritten during the non-operative period T1. In this case, the CPU 110A satisfactorily transmits only the display data to be stored (changed in display). In this case, it is assured that the number of the pixels requiring storage operation be equal to or less than the number of pixels to be scanned for storage operation. Consequently, the clock frequency required for storage operation can be suppressed and the exchange with the CPU 110A be lessened. For power reduction, it is the most effective to carry out storage operation by this method.

Herein as for the storage circuit section 21, although the memory cells if configured by static memories dos not require data rewriting (refresh), they if configured by dynamic memories require refresh in such timing as can hold storage.

According to the first embodiment as above, the portions including the peripheral circuit besides the display section are integrally formed as systems on a glass substrate, and further the storage circuit section 21 (memory cells) and PWM waveform forming circuit 23 (DAC) required for causing the dots at certain tonal levels is formed matched to a dot-array pattern. Accordingly, there are no need to newly lay out and design these circuits in an area other than the active-matrix LCD section 2. The systems can be formed on a panel (glass substrate) and further extreme space saving be achieved. Moreover, because each dot possesses a storage circuit section 21, the display data in amount of one screen can be all stored.

Consequently, even if only the image signal in amount of display data for the pixels to be rewritten be transmitted from the CPU 110A, it can be stored in the storage circuit section 21 corresponding to the pixels. Because the row decoder 31 and the column decoder 41 can select on a pixel unit basis, the system overall is reduced in data transmission amount and hence in consumption power. Furthermore, because the memory controller 5 and the timing controller 6 are also integrally formed on the panel 1, the panel 1 can be directly coupled to the CPU 110A thus making the system overall low in cost, high in reliability and less in space.

Embodiment 2

Figure 6:
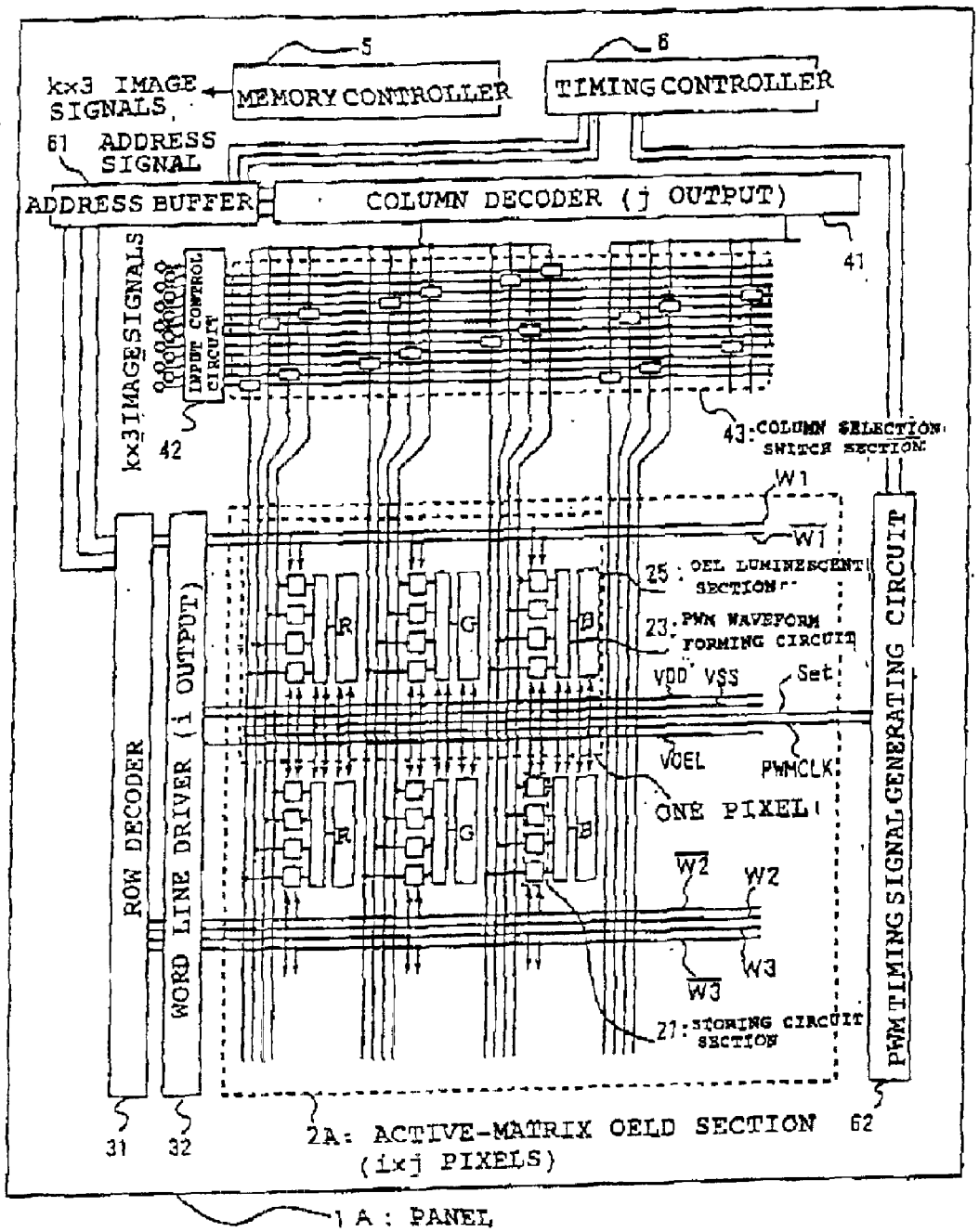
FIG. 6 is a diagram representing in detail a drive section of the panel 1A according to a second embodiment of the invention.

FIG. 6 is a diagram representing in detail a drive section of a panel 1A according to a second embodiment of the invention. In the figure, those denoted with the same reference numerals as in FIG. 2 operate in the same way, hence the explanations thereof being omitted. In the figure, 2A is an active-matrix OELD (Organic ElectroLuminescent Displays) section. The active-matrix OELD section 2A employs an OEL luminescent section 25 in place of the LC section 24 of the active-matrix LCD section 2. The OEL luminescent section 25 is constituted with OEL devices. The OEL device signifies organic EL devices (Organic ElectroLuminescent devices). The OEL device in one of current-driven electroluminescent devices. This current-driven electroluminescent device is a spontaneous luminescent device which emits light upon supply of electric current unlike a liquid crystal. The EL devices including organic and inorganic ones among such current-driven luminescent devices have the following features and are expected in the field of displays and the other fields. The OEL device is cheap in material and enhanced in electro-optical conversion efficiency by research and development, thus achieved in power reduction furthermore.

(1) wide viewing angle
(2) weight and thickness reduction possible
(3) high contrast ratio
(4) low consumption power (backlight not needed)
(5) various optical characteristics (hue degree, spectral characteristics, brightness, etc.) realized by molecular design of material.
(6) high definition display possible owing to current drive.

Figure 7:
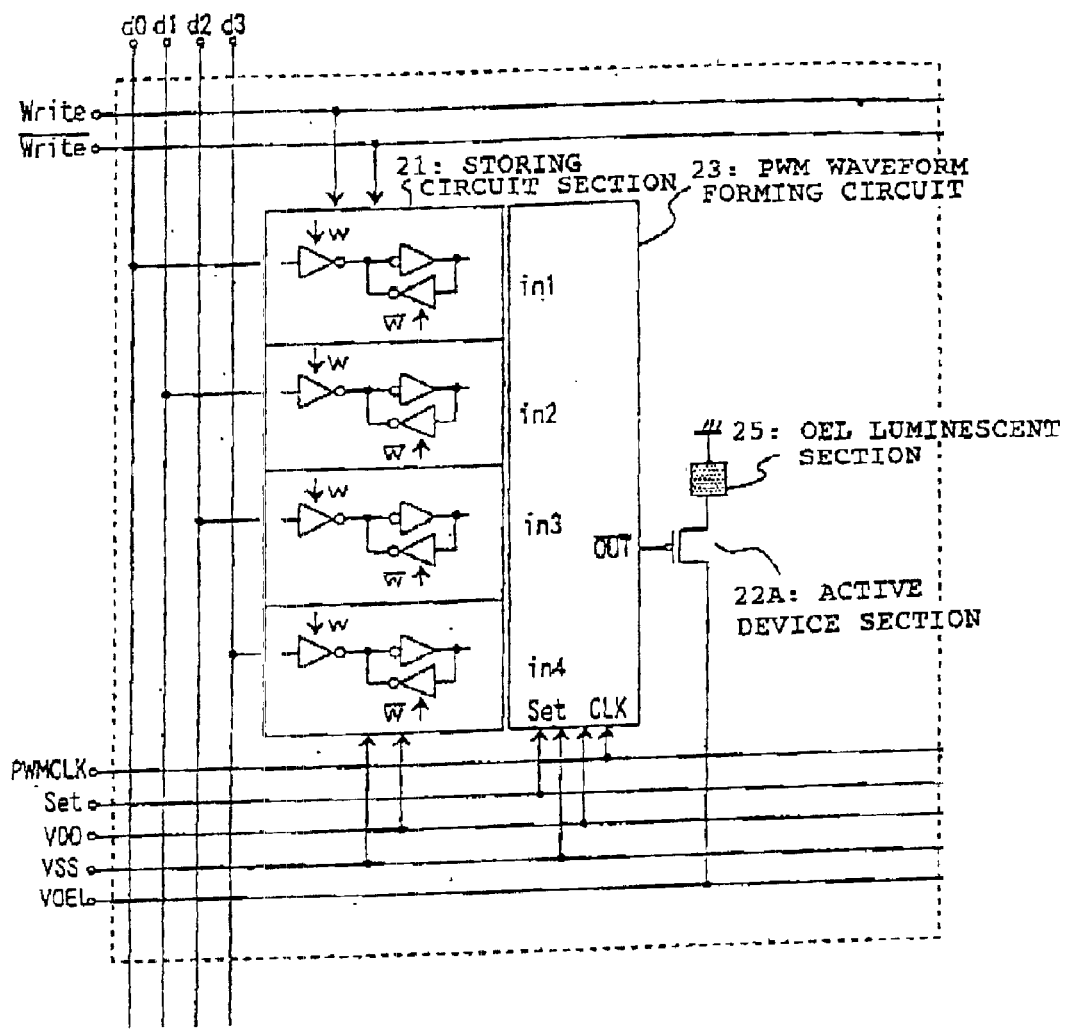
FIG. 7 is a diagram representing an equivalent circuit configured in each dot of an active-matrix OELD section 2A.

FIG. 7 is a diagram representing an equivalent circuit configured in each dot of the active-matrix OELD section 2A. In FIG. 7, those denoted with the same reference numerals an in FIG. 3 operates similarly to the explanation in the first embodiment, hence the explanations thereof being omitted. In the figure, 22A is an active device section similar to the active device section 22. In FIG. 7, p-channel TFTs are used. The OEL device is satisfactorily driven on direct current (DC) and hence structurally made simpler than the active device for driving liquid crystal. Furthermore, the number of interconnections can be lessened because one word line for VOEL is satisfactorily provided in place of providing two (VLC, VCOM) word lines as in the LCD. 25 is an OEL luminescent section mentioned before. In this embodiment, similarly to the first embodiment, the display operation by the panel formed by the concept of SOP is implemented by emitting the OEL devices instead of doing on the optical rotatory power of liquid crystal.

Next, explanation will be made on the operation of the present embodiment. The present embodiment is basically not different in operation from the first embodiment. However, the active device section 22A must be operated on negative logic because of the p-channel TFTs. Consequently, the waveforms the PWM waveform forming circuit 23 converts based on the image signal are reverse in polarity to those of FIG. 5. Also, the OEL devices, because of satisfactorily driven on direct current, usually do not require refresh with inversion driving (however, the active device section 22A of FIG. 7 because of dynamic devices requires the supply of current to maintain display).

According to the second embodiment as above, in a display device having a panel 1A that the portion including the peripheral circuits is integrally formed as systems over a glass substrate and further the storage circuit section 21 and PWM waveform forming circuit 23 required for causing the dot at certain tonal levels are formed within each dot, display is made using current-driven luminescent devices that emit light by current supply instead of using the drive to liquid crystal thus achieving high-definition display and the like. Moreover, backlight is not required hence achieving power reduction. In particular, the present embodiment implementing display by emitting the OEL devices among the EL devices of the current-driven luminescent devices has features of the EL devices of thin film devices formed over a large-sized glass substrate and achieving thickness reduction and size increase, capacity increase (high definition on the dot matrix) and full color. Furthermore, cost is reduced because of inexpensive material and power is reduced furthermore owing to high electro-optical conversion efficiency. Moreover, because the active-matrix OELD section 2A is OELD of the active-matrix type, drive voltage can be largely reduced as compared to the simple-matrix type display. The use of efficient operation points achieves further power reduction. Furthermore, because the EL devices are thin-film devices, space saving and thickness reduction are achieved (without the necessity of using two glass substrates for sandwich as in the liquid crystal) in case the system overall is integrally formed based on SOP. The OEL-device manufacture process can be implemented by a low-temperature process as compared to the TFT manufacture process essential for the active-matrix type. Accordingly, even if added is an OEL-device forming process after integrally forming the circuits including TFTs on a glass substrate, there is no affection on the TFTs hence convenient in view of the consideration from the various points such as process and yield. For the LCD the interconnection must be made by providing two word lines (VLC and VCOM) for specifying the rows for display, whereas for OELD such word line (VOEL) is satisfactorily one in the number. The further decrease in the number of interconnections achieves layout simplification, space saving, dot-array-pattern area increase (increased opening ratio) and so on. Furthermore, the use of the OEL devices in the saturation area allows for current supply without the substantial affection from deviation in threshold levels of the active devices between the dots.

Embodiment 3

Figure 8:
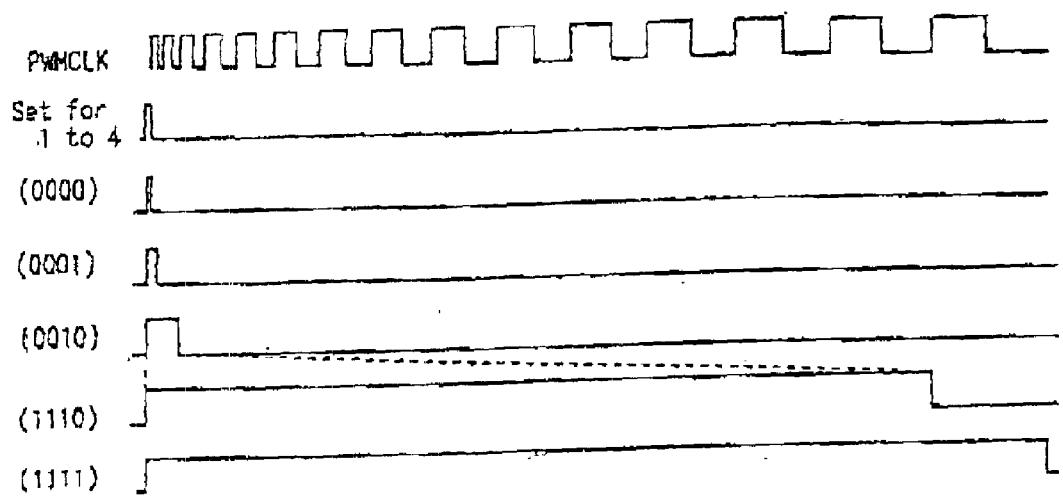

FIG. 8 represents the waveforms in one period of the PWMCLK of the third embodiment. In the first and second embodiments, the PWM timing signal generating circuit 62 generated PWMCLK with the same pulse width (same period). This embodiment generates a generation pulse width of PWMCLK on the basis of a function based, for example, upon γ-correction. A PWM timing signal generating circuit 62A in provided as a circuit for that purpose. Herein, γ-correction is meant, in nature, to correct the relationship of an exponential function called γ-characteristic, such as $D=E^\gamma$, existing between an input quantity of light E and an output value D in a CCD camera or the like. In the LCD or OELD, however, there is also a meaning of correction for providing visually natural tonal representation to the relationship between a value represented by image signals in amount of one dot and a brightness. In this embodiment, the latter meaning is principally used wherein the current for supply to the OEL devices is controlled meeting a γ-characteristic.

For this reason, the PWM timing signal generating circuit 62A generates a generation pulse width of PWMCLK on the basis of a γ-characteristic exponential function. Then, the PWM waveform forming circuit 23 generates a PWM waveforms that the value represented by an image signal is converted based on the PWMCLK generation pulse width. The current to be supplied to the pixel electrode or OEL device is controlled by giving a switching time to the active device section 22 or active device section 22A on the basis of the PWM waveform. The PWMCLK if generated with the same interval of pulse width allows for transmission of set signals in the next group two-pulse after the PWMCLK as in FIG. 4. Herein, the difference from the operation of the first or second embodiment lies in that, because the PWMCLK pulse width varies and the variation provides a period, there is a need of transmitting set signals in a manner matched to this period.

According to the third embodiment as above, the PWMCLK pulse width is set based on a γ-characteristic exponential function to provide the switching time by the active device section on the basis of a PWM waveform generated matched to the PWMCLK, thereby enabling current supply to the pixel electrodes or OEL devices on the basis of γ-correction. Due to this, the relationship between a display data value (value based on the image signal) and a tonal level (brightness) can be represented linearly.

Embodiment 4

Figure 9:
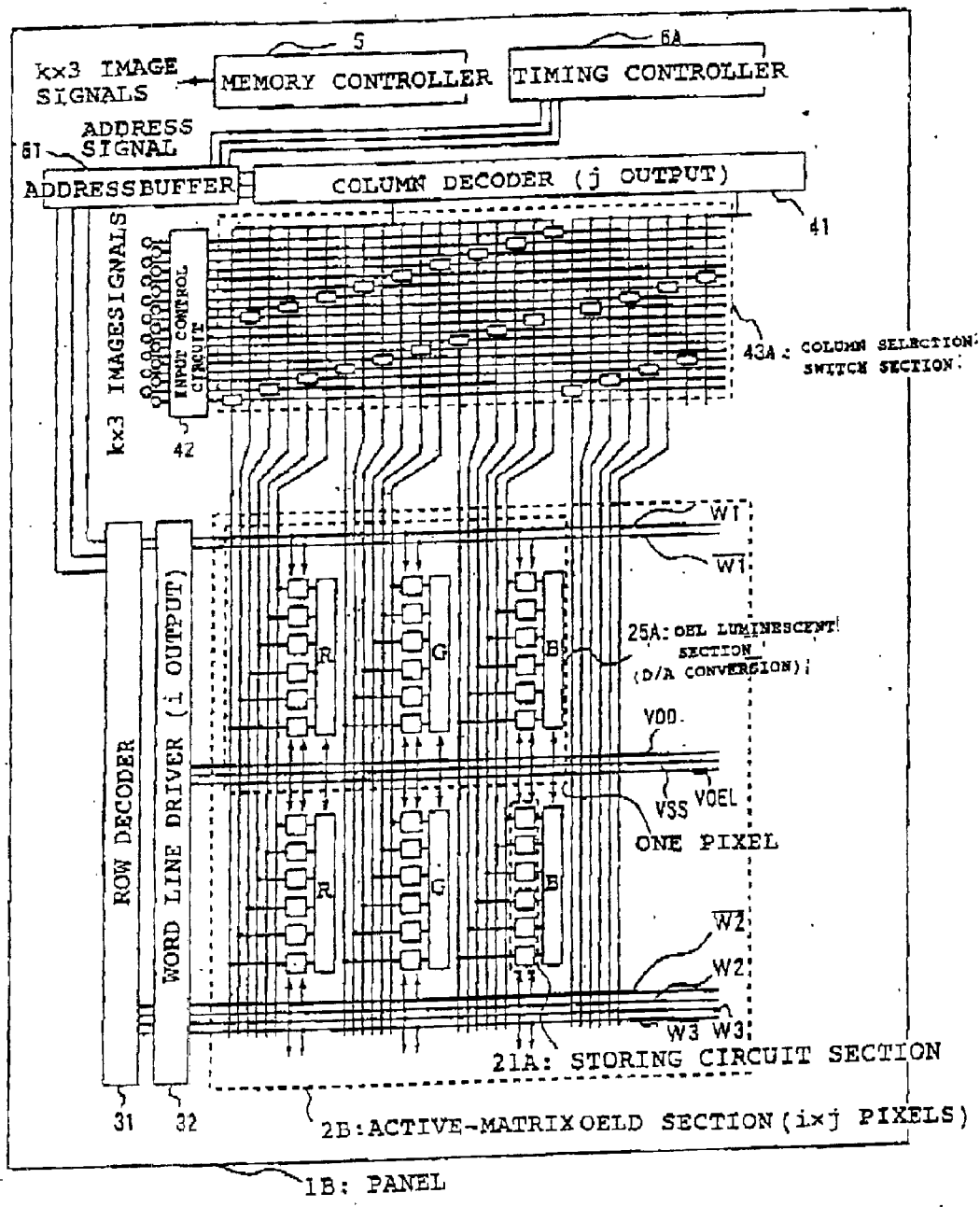
FIG. 9 is a diagram representing in detail a drive section of a panel 1B according to a fourth embodiment of the invention.

FIG. 9 is a diagram representing in detail a drive section of a panel 1B according to a fourth embodiment of the invention. In the figure, those denoted with the same reference numerals as in FIG. 2 operate the same as in FIG. 2, hence explanations thereof being omitted. 43A is a column selection switch section which operates similarly to the column selection switch section 43 as explained in the first embodiment. The present embodiment, because of k=6 given, is different only in that the column selection switches are provided in the corresponding number. Also, the timing controller 6A operates basically similarly to the timing controller 6. However, this embodiment is different in that no timing signal is transmitted because of absence of a PWM timing signal generating circuit 62.

Figure 10:
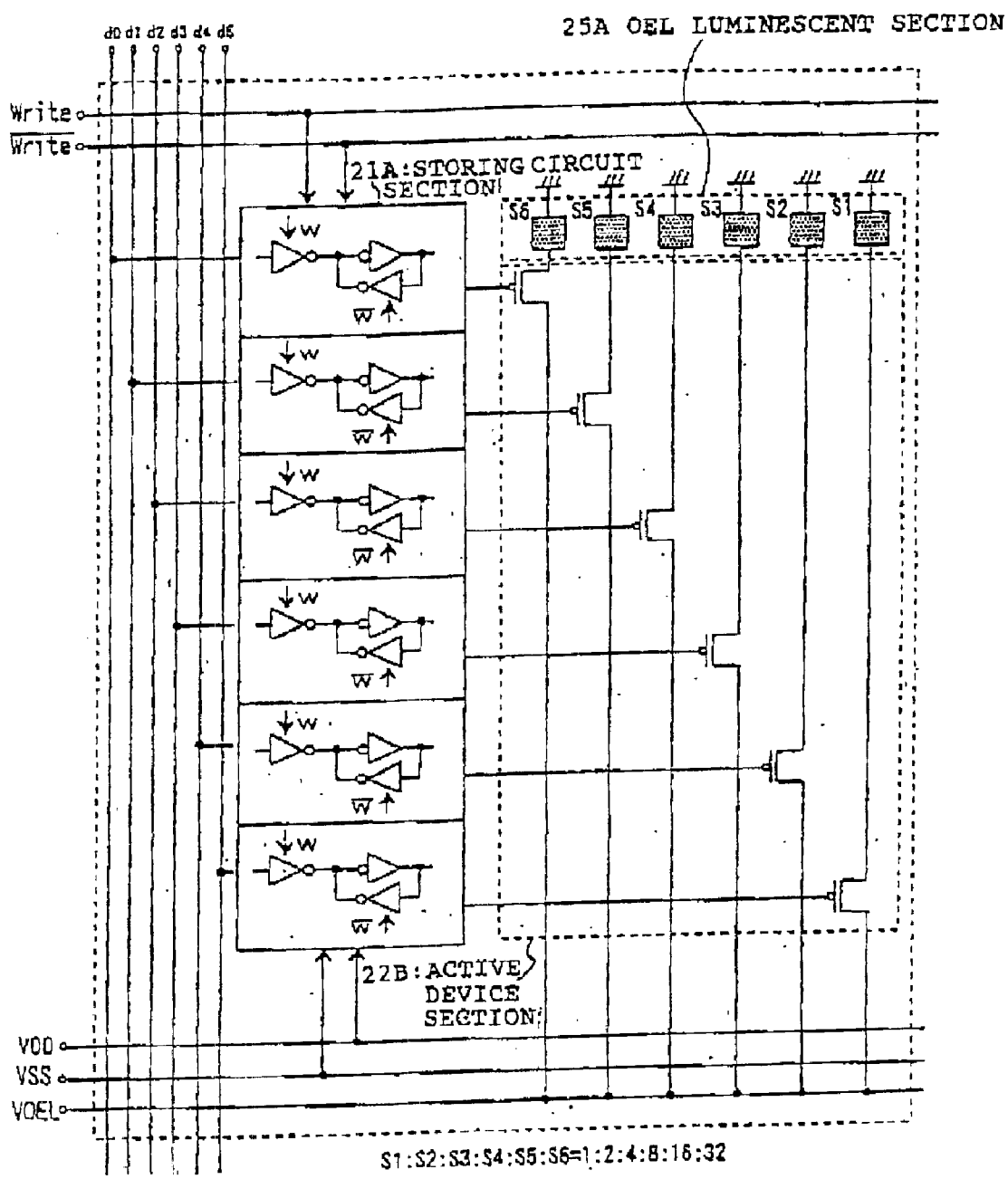
FIG. 10 is a diagram representing an equivalent circuit configured in each dot of an active-matrix OELD section 2B.

FIG. 10 is a diagram representing an equivalent circuit configured in each dot of the active matrix OELD section 2B. In FIG. 10, 21A is a storage circuit section. The different point from the first and second embodiment lies in that six memory cells are provided correspondingly to k=6. Meanwhile, 22B is an active device section similar to the active device section 22A. However, the active device section 22B is different from the active device section 22A in that the active devices directly connected to the memory cells are provided in the number of the memory cells (six in FIG. 10). 25A is an OEL luminescent section. In FIG. 10, six OEL devices are connected to the respective active devices. Herein, actually each OEL device has an area corresponding to the value $(2^{k-1})$ represented by an image signal on each memory cell connected, wherein the area ratio is given as S1:S2:S3:S4:S5:S6=1:2:4:8:16:32. These are set to emit light at a brightness corresponding to the area.

The present embodiment is caused to emit light by combining the OEL devices different in area connected to the respective memory cells and active devices, thereby representing a tonal level of each dot by the luminescent area. The circuit is intended for simplification without the provision of the DAC (PWM waveform forming circuit 23) in each dot as provided in the second embodiment. Space saving is made by simplified interconnections and omitted peripheral circuits without the provision of PWMCLK and Set signal lines and a PWM timing signal generating circuit 62 for transmitting such signals.

Next, the operation of the present embodiment will be explained based on FIG. 9 and FIG. 10. As for storage operation, operation is made similarly to the explanation in the first embodiment. Using display non-operative period T1, image signals representing a value $2^{k-1}$ (k=1–6) are respectively inputted to d5, d4, d3, d2, d1 and d0.

Next, the operation of display will be explained. On the basis of the image signals stored on the memory calls of the storage circuit section 21A, switching operation is made in each active device of the active device section 22B. It is herein assumed that the switch be in an on state by the active device if the image signal represents "1" while the switch be in an off state if it represents "0". The word line driver 32 drives VOEL. This supplies current to the OEL device connected to an active device whose switch is on. Although display operation can be made by always driving VOEL on all the rows, there is a need of providing a non-operative period T1 in order for storage operation. Because there is a possibility of causing flicker if the non-operative period T1 is given the same for the rows, it is preferred to deviate the non-operative period T1 between the rows. The timing is given by adjusting the VOEL drive by the word line driver 32.

According to the fourth embodiment as above, the devices of the active device section 22B and OEL luminescent section 25A are connected correspondingly to the memory cells of the storage circuit section 21A, so that the place value represented by an image signal of each memory cell is placed corresponding to the OEL device area connected to each memory cell. On the basis of an input image signal, OEL luminescence is controlled to control the luminescent area, thereby representing a tonal level on each dot. Accordingly, circuit simplification is achieved without the provision of the DAC on a dot-by-dot basis. Due to this, because there is no need of providing the signal lines, such as for PWMCLK and Set, and PWM timing signal generating circuit 62 for transmitting such signals, space saving is achieved by simplified interconnections and omitted peripheral circuits. Furthermore, as mentioned before, the use of the OEL devices in a saturation region makes possible to supply current without substantial influence of a threshold level of the active device section 22B in each dot.

Embodiment 5

Figure 11:
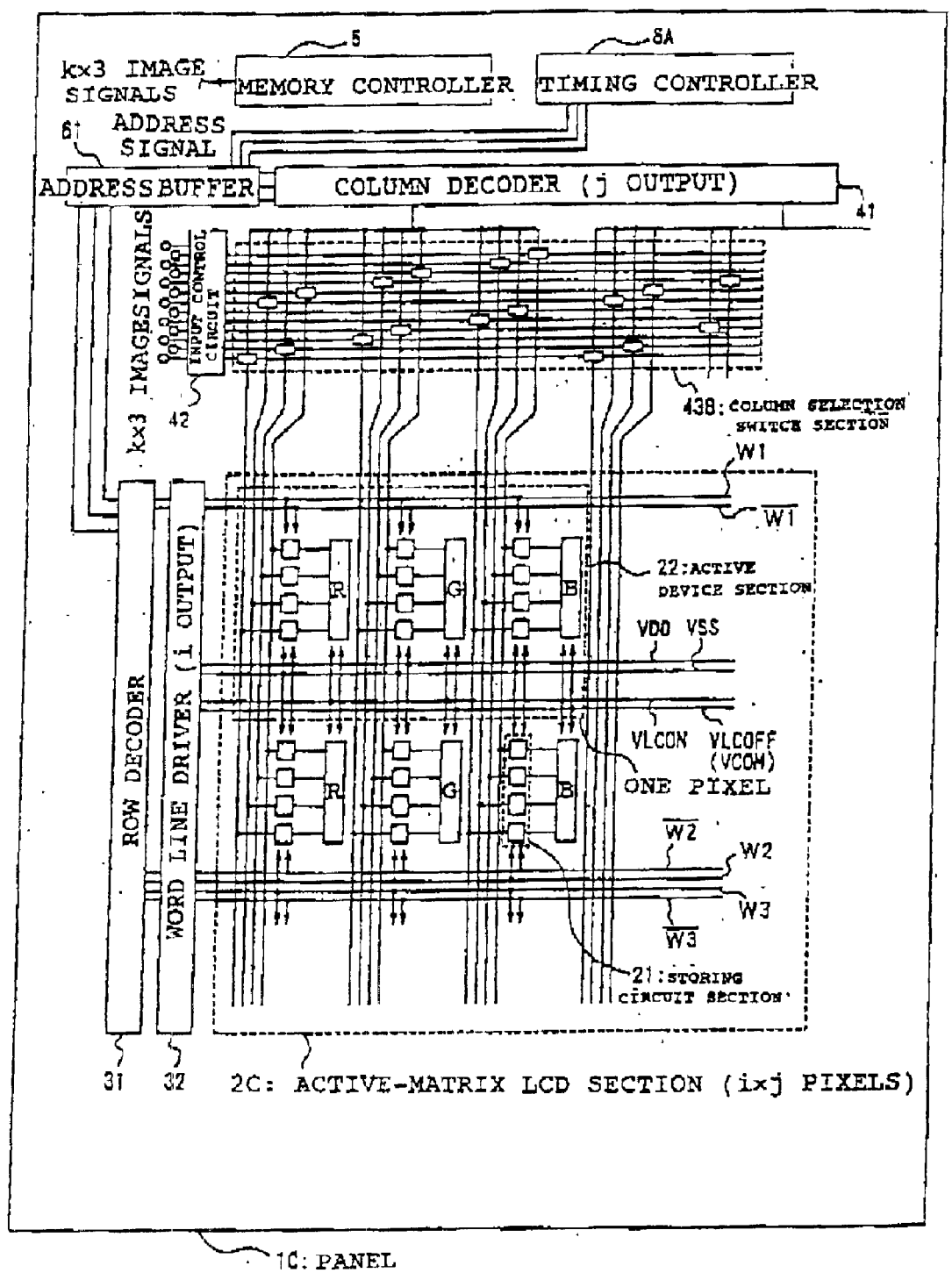
FIG. 11 is a diagram representing in detail a drive section of a panel 1C according to a fifth embodiment of the invention.

FIG. 11 is a diagram representing in detail a drive section of a panel 1C according to a fifth embodiment of the invention. In the figure, those denoted with the same reference numerals as in FIG. 9 operate similarly to FIG. 9, hence explanations thereof being omitted. This embodiment is given k=4 and has a column selection switch 43B correspondingly to that. Meanwhile, an active matrix LCD section 2C is provided in place of the active matrix OELD section 2B.

Figure 12:
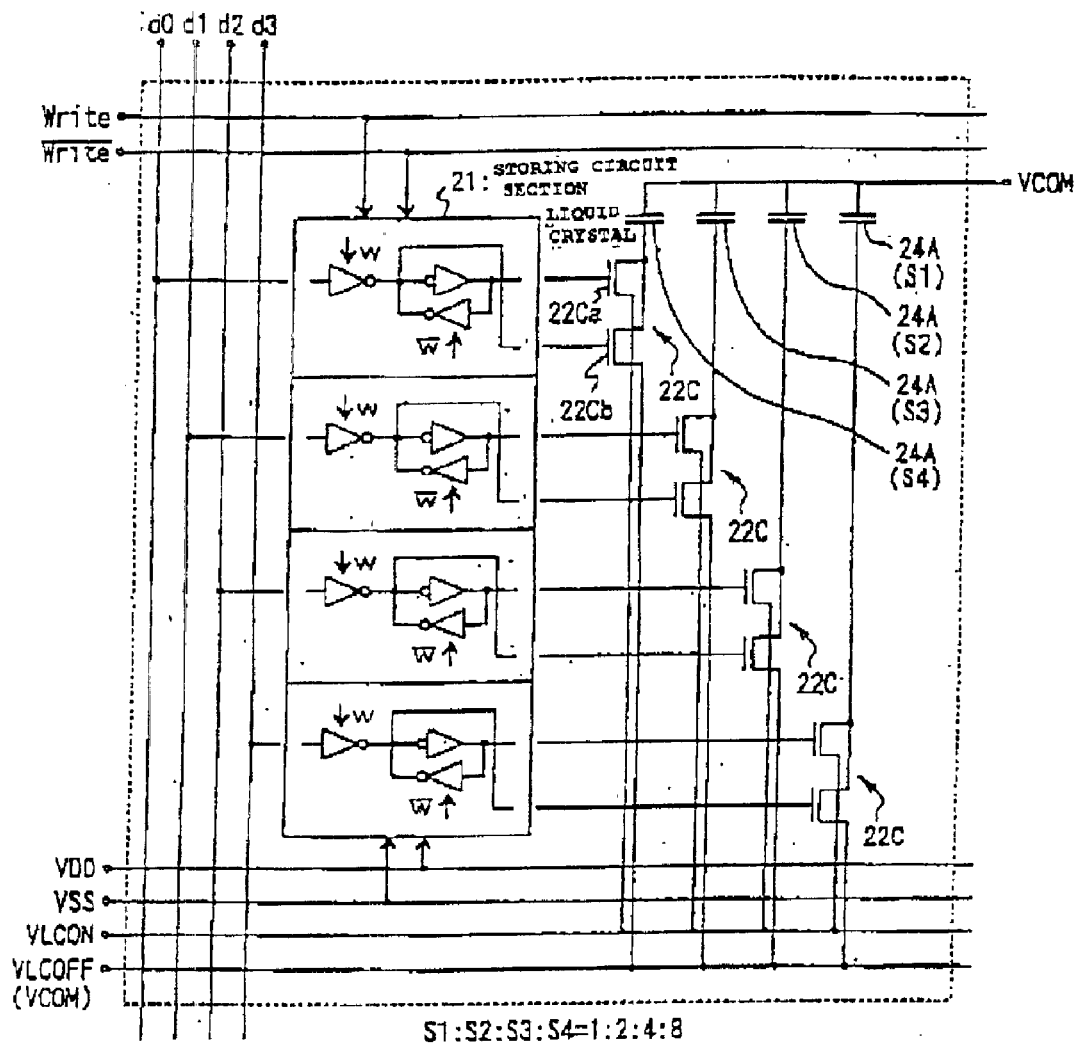
FIG. 12 is a diagram representing an equivalent circuit configured in each dot of an active-matrix LCD section 2C.

FIG. 12 is a diagram representing an equivalent circuit configured in each dot of the active-matrix LCD section 2C. In FIG. 12, 22C is active-matrix device sections provided in the number of memory cells (four in FIG. 12). The active device is configured, for example, with two N-channel TFTs or the like. One active device 22Ca has a gate to be inputted by an output of the memory cell while the other active device 22Cb has a gate to be inputted by an inverted output of the memory cell. The memory cell (storage circuit 21) is configured by a static memory cell as represented by one or a plurality of latch circuits, similarly to the above embodiments. The storage data of the memory circuit 21 is supplied to the gate of the active device 22Ca while the inversion data to the storage data of the memory circuit 21 is supplied to the gate of the active device 22Cb.

Meanwhile, 24A is LC sections provided in the number of the memory cells (four in FIG. 12). These LC sections 24A are respectively interposed between counter electrodes and active device sections 22C, and connected to a drain (source) side of the active devices 22Ca and 22Cb.

The source (or drain) side of the active device 22Ca to be supplied by an output of the memory cell is connected to a signal line of an alternating-current signal VLCON inverting at a predetermined time interval while the source (or drain) aide of the active device 22Cb to be supplied by an inverted output of the memory call is connected to a signal line of a direct-current signal VLCOFF having a potential VCOM of the counter electrode.

Figure 13:
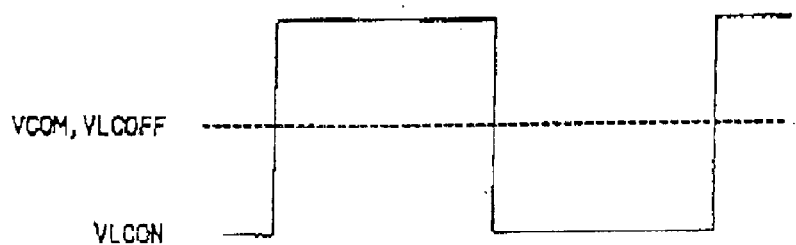
FIG. 13 represents a waveform of an alternating current signal VLCON in a fifth embodiment.

The alternating-current signal VLCON, as shown in FIG. 13, is a signal inverting at a predetermined time interval with reference to the counter electrode potential VCOM as a reference, and is an alternating-current voltage capable of turning on the LC section 24A. Meanwhile, the direct-current signal VLCOFF is a direct-current voltage capable of turning off the LC section 24A. These alternating-current signal VLCON and direct-current VLOFF are generated in the word line driver 32.

The pixel electrodes, not shown, of the LC section 24A have areas different from one another. Provided for example that in FIG. 12 the pixel electrode of an LC section 24A has an area of S1, S2, S3 or S4 in the order from the right, the area ratio is given S1:S2:S3:S4=1:2:4:8.

The present embodiment has a combination of a plurality of LC sections 24A having pixel electrodes different in area to apply the same voltage to between the pixel electrodes and the counter electrode, thereby representing a tonal level on each dot caused by the difference of brightness due to the difference of area. Similarly to the fourth embodiment, circuit simplification is intended without the provision of the DAC (PWM waveform forming circuit 23) on each dot as was provided in the first embodiment. Also, space saving is achieved by simplified interconnection and omitted peripheral circuits without the provision of PWMCLK and Set signal lines and a PWM timing signal generating circuit 62 for transmitting such signals.

Next, the operation of this embodiment will be explained based on FIG. 12. As for storage operation, operation is made similarly to the explanation in the first embodiment. Using display non-operative period T1, image signals representing a value $2^{k-1}$ (k=1–4) are respectively inputted to, d3, d2, d1 and d0.

Next, the operation of display will be explained. On the basis of the image signals stored on the memory cells of the storage circuit section 21, switching operation is made in each active device of the active device section 22C. It is herein assumed that the active device 22Ca be in a switched-on state and the active device 22Cb be in a switched-off state if the image signal represents "1" while the active device 22Ca is in an off state and the active device 22Cb be in an on state if it represents "0". The word line driver 32 outputs an alternating-current signal VLCON inverting with a predetermined period and a direct-current signal VLCON having a counter electrode potential VCOM. Due to this, where the image signal is "1", the active device 22Ca is switched on and the active device 22Cb is switched off thereby applying an alternating-current signal VLCON to the pixel electrodes of the LC sections 24A.

Conversely, where the image signal is "0", the active device 22Ca is switched off and the active device 22Cb is switched on thereby applying a direct-current signal VLOFF, i.e. counter electrode potential VCOM, to the LC sections 24A.

In this case, because the areas of the pixel electrodes are set to have an area ratio of 1:2:4:8, even where the same potential is applied, brightness is given different for each of the LS sections 24A thus effecting tonal representation.

According to the fifth embodiment as above, the active device section 22C and LC sections 24A different in pixel-electrode area are connected correspondingly to the memory cells of the memory circuit section 21 so that the brightness on the LC sections 24A is controlled at the basis of the input image signal thereby representing a tonal level on each dot. Accordingly, circuit simplification is achieved without the provision of the DAC on a dot-by-dot basis, thus achieving space saving similarly to the fourth embodiment.

Meanwhile, in this case, because the counter electrode potential VCOM is applied as a direct-current signal VLCOFF, circuit simplification is achieved without newly providing a power source for the direct-current signal VLCOFF.

Also, in the fifth embodiment, the signal lines VDD, VSS, VLCON and VLCOFF can be shared between two rows, thus achieving layout simplification owing to decrease in the number of interconnections, space saving, dot-array pattern area increase (opening ratio increase) and so on.

Embodiment 6

Figure 14:
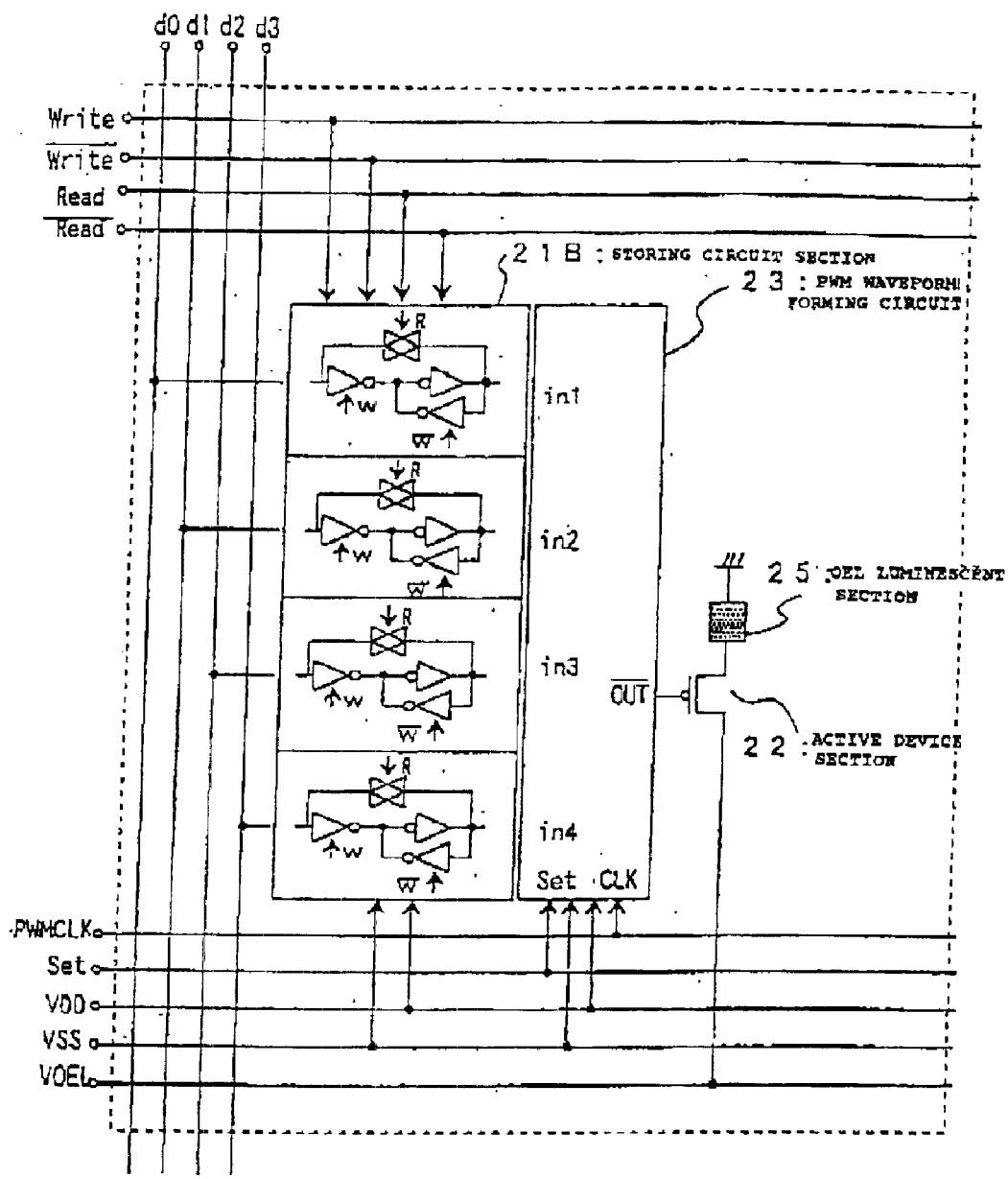
FIG. 14 is a diagram representing an equivalent circuit configured in each dot in a sixth embodiment of the invention.
Figure 15:
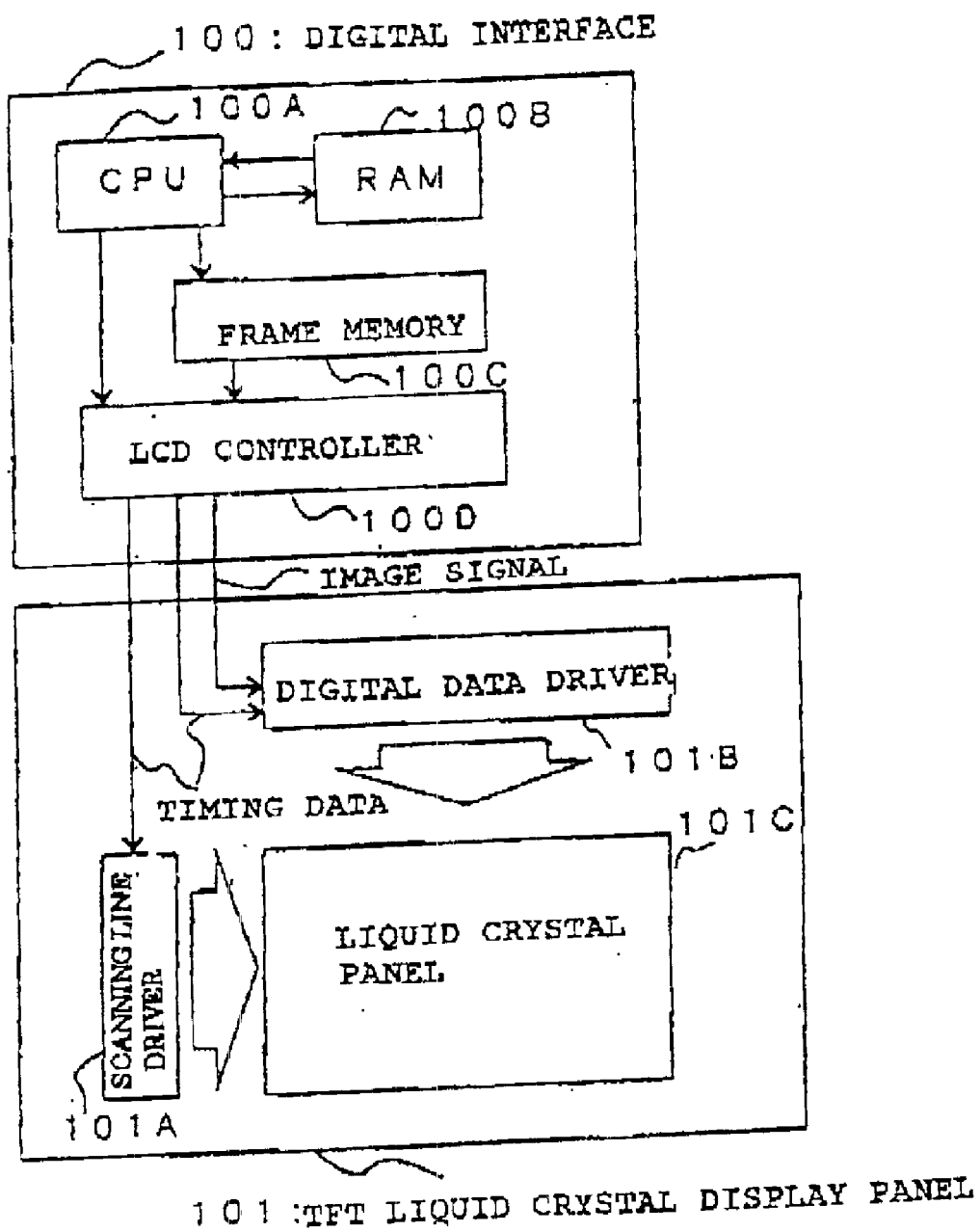
FIG. 15 is a block diagram of a system for performing display by a display device due to a TFT display.

FIG. 14 is a diagram showing an equivalent circuit configured in each dot in a sixth embodiment of the invention. In FIG. 14, those denoted with the same reference numerals as in FIG. 7 operate similarly to FIG. 7, hence explanation thereof being omitted. 21B is a storage circuit section. The difference from the storage circuit section 21 explained in the first embodiment lies in that the image signal stored is to be read out. Accordingly, the image signal is not only stored for display but can be used for such an application of exchanging display data with the CPU 110A, for example.

It is needless to say that the timing of reading display data out of the storage circuit section 21B cannot be simultaneous with Write (storage) and Read (reading out of display data) of display data. Because the data lines are commonly used for Write and Read (same route in reading and storage) from the structural relationship, Read is not allowed even during Write to another pixel. From the above, when Write is not being done to a certain pixel, Read is possible. Moreover, because synchronization with display timing is not especially made, reading out may be made during a display-operation period even within a range having no affect upon display.

According to the sixth embodiment as above, display data (image signal) is to be read out of the storage circuit section 21B thus being used for other applications. Despite the reading rate is lower as compared to the usual memory, as concerned with display data it is possible to reduce the storage circuits (memories) in respect of cost, occupation area and the like.

Incidentally, although in the sixth embodiment explanation was made on the case that display data is to be read out of the storage circuit section 21B in the second embodiment shown in FIG. 7, application is possible to the storage circuit section 21 in the fifth embodiment shown in FIG. 12. In this case, the storage circuit section 21 may be configured such that the image signal stored can be read out similarly to the sixth embodiment. This makes it possible to obtain the operation and effect equivalent to the sixth embodiment.

Embodiment 7

Although the above embodiment had one pixel to be selected in one time by the column decoder 41, the invention is not limited to this. Pixels in plurality are configured to provide each set, and the column decoder 41 is provided to select the data lines on a set-by-set basis. Furthermore, the number of display data to be inputted to the input control circuit 42 is matched to them (for twice, k×2×3 image signals) thereby enabling input-control the display data for the set at one time. With such a configuration, the display data in plurality can be dealt with at one time. Despite interconnections are increased, the clock frequency required for storage can be lowered than that in the case of storage on a pixel-by-pixel basis. Thus, power consumption can be reduced.

Effect of the Invention

As described above, in order to control on-screen display, this display device has, in each dot, a storage section for storing a signal and a display control section for controlling on-screen display on the basis of the signal stored by the storing section. These are integrated on a semiconductor or insulating substrate, i.e. within each dot array pattern. Accordingly, it is possible to decrease the circuits to be configured in an area other than the display region and to achieve space saving.

Also, this display device has, in each dot, a storing section configured by one or a plurality of storing circuits for storing image signals as digital data signals, a converting section for converting a value based on the image signals into an analog signal, and a display control section for performing tonal control using a liquid crystal on the basis of the analog signal. These are integrated on a semiconductor or insulating substrate, i.e. within each dot array pattern. Accordingly, the integration matched to a display region eliminates the necessity of laying out them outside the display region, thus achieving space saving. This invention is effective particularly for the reflective liquid crystal display device in view of the problem with transmissivity. Also, because the storing section is provided in each dot to store all the signals required for on-screen display, signal exchange can be decreased. This achieves the reduction of consumption power.

Also, in this display device, the storing circuit is configured by a static circuit, thereby achieving image-signal holding over a long term as compared to a dynamic circuit.

Accordingly, despite the number of devices increases, there is no necessity of changing storage in the portions display is not to be changed. This decreases exchange of image signals, thus achieving power reduction.

Also, in this display device, because the converting section performs pulse width modulation in converting a value based on the image signals into an analog signal, the image signal can be efficiently converted into an analog signal.

Also, in this display device, because the converting section performs pulse width modulation based on a γ-characteristic in converting a value based on the image signals into an analog signal, the relationship between a value based on the image signals and a brightness can be linearly expressed.

Also, in this display device, the converting section performs conversion into the analog signal with a predetermined period. Accordingly, where display control is made, for example, by a liquid crystal, it is convenient for cases requiring refresh at a constant time interval.

Also, in this display device, provided is a duration that no conversion into an analog signal is made in a duration of the constant period. Accordingly, in this duration, it is possible to change the image signals to the storing section. Thus stabilization of display is achieved.

Also, in this display device, a start time of the constant period is different between converting sections, and the duration no conversion into an analog signal is made is made different. Non-operative duration can be made different and flicker can be suppressed.

Also, in this display device, because an alternating current drive voltage is applied, lifetime can be increased even where performing display using a liquid crystal.

Also, in this display device, a voltage driven at VCOM±Va with respect to a reference voltage VCOM is provided as an alternating current drive voltage, power consumption can be suppressed. Moreover, because the reference voltage is constant on any of the rows, scanning is possible.

Also, in this display device, because a voltage alternating-current-inversion-driven by two voltage-applying lines laid correspondingly to the dot array pattern is provided as an alternating current drive voltage, the configuration of the circuit to be driven can be simplified.

Also, in this display device, because an alternating current drive voltage opposite in phase on the rows in pair is applied, flicker can be suppressed. Also, on the rows in pair, the lines to be applied by the voltage can be shared.

Also, in this display device, current-driven luminescent devices are connected to the display control section so that the emitted light thereof is controlled on the basis of the analog signal thereby achieving tonal control. Accordingly, space saving is possible. Moreover, power reduction can be achieved by the use of the current-driven luminescent devices. In addition, the use of the current-driven luminescent device in a saturated region makes possible display without substantial influence of variation of operational condition possessed by the display control section.

Also, in this display device, one or a plurality of storing circuits, active devices and current-driven luminescent devices are correspondingly connected, wherein each current-driven luminescent device is given an area corresponding to place values represented by the image signals connected, enabling tonal display due to the area. Accordingly, tonal control directly using the image signals is possible without providing such a circuit as the converting section. Furthermore, the use of the current-driven luminescent device in a saturation region makes possible display without suffering substantial influence of variation in operational condition possessed by the display control section.

Also, in this display device, because display is made by the EL devices, display is possible with high definition, reduced thickness and increased area, increased capacity or the like. Also, because there is no necessity of using backlight as in the transmissive LCD, consumption power reduction can be achieved.

Also, in this display device, because display is made by organic EL devices, material is inexpensive and further electro-optical conversion efficiency is high thereby achieving further power reduction besides the capability of displaying with high definition as by the EL devices. Also, because there is no need of using backlight as in the transmissive LCD, power consumption reduction can be achieved.

Also, in this display device, one or a plurality of storing circuit, active devices and a liquid crystal are correspondingly connected, to provide a liquid crystal drive section for driving each liquid crystal with an area corresponding to a value of a place represented by the image signal connected, thereby enabling tonal display due to the area. Tonal control directly using image signals can be made without providing such a circuit as the converting section.

Also, in this display device, because the image signals stored in the storing circuits can be read out, the display device can operate as storing means. Consequently, the storing means can be saved.

Also, in this display device, integrated on a semiconductor or insulating substrate are a display drive section having a storing section and a display control section in each dot array pattern, a word line driver section for controlling transmission of a word signal, a row decoder section for transmitting a write signal to a selected row, a column decoder section for selecting data lines and a column selection switch section for transmitting the image signal by switching operation. Accordingly, besides the display portion, the portions including peripheral circuits are all integrally formed without using a chip or the like. Moreover, because the storing section is provided within each dot array pattern, there is no necessity of laying out outside the display region, thereby further achieving extreme space saving.

Also, in this display device, because in the display drive section the converting section for converting the image signals into an analog signal is provided within the dot array pattern, further space saving can be achieved.

Also, in this display device, because the word lines are shared by the display control section on two rows to transmit a word signal (supply power), interconnection can be reduced thereby achieving layout simplification, space saving, opening ratio increase and so on.

Also, in this display device, the word line driver section and the row decoder section are allocated corresponding to a length of the display drive section in a row direction and the column decoder section and the column selection switch section are allocated corresponding to a length of the display drive section in a column direction. Accordingly, the layout other than the display region can be reduced in size as small as possible, thus achieving space saving.

Also, in this display device, because each column selection switch is allocated corresponding to a width of the dot array pattern, efficient layout can be made.

Also, in this display device, because the row decoder section selects a row for transmitting a write signal on the basis of an address signal, selection with high freedom can be made in selecting a row to be changed.

Also, in this display device, selection with high freedom can be made by selecting data lines on the basis of the address signal by the column decoder section.

Also, in this display device, because the column decoder section selects the data lines for storing the image signal in an amount of one pixel, inputting is possible on a one-pixel-unit basis as a reference of display change.

Also, in this display device, where performing color display, image signals are inputted on a plurality-of-pixels basis and the column decoder section selects data lines in an amount of a plurality of pixels on the basis of that input. Accordingly, despite the interconnections are complicated, the clock frequency used for storage can be lowered thereby achieving consumption power reduction. Also, even if the active devices inferior in characteristic to single-crystal TFTs are operated as the display control section, sufficient operation is obtained.

Furthermore, in this display device, because the peripheral circuits required for controlling display are all systematically integrally formed on the same substrate, the system entirety can be reduced in cost, improved in reliability and saved in space.

What is claimed is:

1. A display device, comprising:
   a plurality of write lines;
   a plurality of data lines;
   a plurality of dots disposed correspondingly to intersections between the plurality of write lines and the plurality of data lines, each of the plurality of dots for displaying, including:
      a storing section having memory cells configured by static circuits, each of the static circuits storing a data signal supplied from a respective different one of the plurality of data lines; and
      a display control section that performs display control on the basis of the data signal held by the storing section; and
   a plurality of read lines disposed correspondingly to the plurality of dots, read out of the data signal held by the storing section being performed when a read signal is transmitted through a respective different one of the plurality of read lines.

2. A display device according to claim 1, wherein the write signal being supplied to only a dot to be written of the plurality of dots.

3. The display device according to claim 1, further comprising a plurality of first lines for supplying a voltage as a power source to the storing section, the plurality of first lines being shared between two rows of the plurality of write signal lines.

4. The display device according to claim 1, further comprising:
   a column decoder section that selects a data line of the plurality of data lines;
   a row decoder sections that selects a write line of the plurality of write lines;
   the plurality of dots being included in an active matrix section;
   the row decoder section being allocated correspondingly to a length the active-matrix section in a column direction; and
   the column decoder section being allocated correspondingly to a length of the active-matrix section in a row direction.

5. The display device according to claim 4, further including a column selection switch section that transmits the data signal to a data line of the plurality of data lines selected by the column decoder section.

6. The display device according to claim 5, the column selection switch section being allocated correspondingly to a length of the active-matrix section in a row direction.

7. The display device according to claim 4, the row decoder that selects a row of the plurality of write lines through which a write signal is transmitted on the basis of an address signal.

8. The display device according to claim 4, the column decoder section that selects a data line of the plurality of data lines on the basis of an address signal.

9. The display device according to claim 4, further including:
   a plurality of pixels each of which being provided by three dots for red, green and blue, respectively, of the plurality of dots;
   the column decoder section selecting data lines of the plurality of data lines corresponding to a respective pixel of the plurality of pixels; and
   the data signal being supplied together to the three dots included in a respective one of the plurality of pixels.

10. The display device according to claim 4, further including:
    a plurality of pixels each of which being provided by three dots for red, green and blue, respectively, of the plurality of dots;
    the column decoder section selecting data lines of the plurality of data lines corresponding to respective pixels of the plurality of pixels; and
    the data signal being supplied together to the three dots included in the respective pixels.

11. The display device according to claim 1, each of the plurality of dots further comprising an electro-optical conversion section that performs an electro-optical conversion on the basis of a data signal.

12. The display device according to claim 1, wherein a number of the memory cells corresponds to a tonal level, a degree of the tonal level being determined by the data signal stored by the memory cells.

13. A display device, comprising:
    a plurality of write lines;
    a plurality of data lines;
    a plurality of dots disposed correspondingly to intersections between the plurality of write lines and the plurality of data lines, each of the plurality of dots for displaying, including:
      a storing section having a first static circuit and a second static circuit, the first static circuit storing a first data signal supplied through a first data line of the plurality of data lines, and the second static circuit storing a second data signal supplied through a second data line of the plurality of data lines;
      a converting section that converts a value based on a value of the data signal held by the storing section into an analog value; and
      a display control section that performs tonal control on the basis of the data signal including the first data signal and the second data signal held by the storing section,
      wherein said converting section performing conversion into the analog value at a constant period interval, and a duration that no conversion into the analog value is made being provided in the constant period.

14. The display device according to claim 13, the analog value being represented as a PWM waveform generated by the converting section.

15. The display device according to claim 13 the analog value including γ-characteristic.

16. The display device as claimed in claim 13, each converting section being different in a start time of the constant period, and the period and the duration no conversion into the analog value is made being different.

17. The display device as claimed in claim 13, an alternating current drive voltage corresponding to the constant period being applied to said display control section.

18. The display device as claimed in claim 17, the alternating current drive voltage being a voltage driven at VCOM±Va with respect to a reference voltage VCOM.

19. The display device as claimed in claim 17, the alternating current drive voltage being a voltage alternating-current-inversion-driven by two voltage-applying lines laid correspondingly to said dot array pattern.

20. The display device as claimed in claim 17, a plurality of rows of said dot array being provided by groups, and rows in pair being set in each of the groups to invert a phase of the alternating current drive voltage applied.

21. The display device as claimed in claim 13, said display control section controlling light emission of current-driven luminescent devices in connection on the basis of the analog signal in place of performing tonal control using a liquid crystal, thereby effecting tonal control.

22. A display device, comprising:
    a substrate;
    a plurality of write lines;
    a plurality of data lines;
    an active-matrix section having a plurality of dots disposed correspondingly to intersections of the plurality of write lines and the plurality of data lines, each of the plurality of dots including an electro-optical conversion section that performs an electro-optical conversion on basis of a data signal supplied through a respective different one of the plurality of data lines;
    a column decoder section that selects a data line of the plurality of data lines;
    a row decoder section that selects a row of the plurality of write lines through which a write signal is transmitted; and
    a timing controller section that controls at least timing of transmitting an address signal on the basis of which at least one of the column decoder section and the decoder section selects at least one data line of the plurality of data lines and the row of the plurality of write lines;
    the plurality of write lines, the plurality of data lines, the active-matrix section, the column decoder section, the row decoder section, and the timing controller section being integrally formed on the substrate.

23. A display device, comprising:
    a substrate;
    a plurality of write lines;
    a plurality of data lines;
    an active-matrix section having a plurality of dots disposed correspondingly to intersections of the plurality of write lines and the plurality of data lines, each of the plurality of dots including an electro-optical conversion section that performs an electro-optical conversion on basis of a data signal supplied through a respective different one of the plurality of data lines;
    a column decoder section that selects a data line of the plurality of data lines;
    a row decoder section that selects a row of the plurality of write lines through which a write signal is transmitted; and
    a memory controller section that controls transmission of the data signals,
    the plurality of write lines, the plurality of data lines, the active-matrix section, the column decoder section, the row decoder section, and the memory controller section being integrally formed on the substrate.

* * * * *